United States Patent
Rashid et al.

(10) Patent No.: US 9,989,637 B2
(45) Date of Patent: *Jun. 5, 2018

(54) PORTABLE COLLISION WARNING APPARATUS

(71) Applicants: Charles Rashid, St. Clair Shores, MI (US); Steve A. Safie, St. Clair Shores, MI (US)

(72) Inventors: Charles Rashid, St. Clair Shores, MI (US); Steve A. Safie, St. Clair Shores, MI (US)

(73) Assignee: Safie Holdings LLC, Warren, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/967,690

(22) Filed: Dec. 14, 2015

(65) Prior Publication Data

US 2016/0170021 A1    Jun. 16, 2016

Related U.S. Application Data

(63) Continuation-in-part of application No. 13/959,140, filed on Aug. 5, 2013, now Pat. No. 9,315,150.

(60) Provisional application No. 61/679,246, filed on Aug. 3, 2012.

(51) Int. Cl.
| | | |
|---|---|---|
| *B60Q 1/00* | (2006.01) | |
| *G01S 13/93* | (2006.01) | |
| *G01S 13/60* | (2006.01) | |
| *G08G 1/16* | (2006.01) | |
| *B60Q 9/00* | (2006.01) | |

(52) U.S. Cl.
CPC .......... *G01S 13/931* (2013.01); *G01S 13/605* (2013.01); *G08G 1/166* (2013.01); *B60Q 9/008* (2013.01)

(58) Field of Classification Search
CPC ......... B60Q 9/00; B60Q 9/008; G01S 13/605; G01S 13/931
See application file for complete search history.

(56) References Cited

U.S. PATENT DOCUMENTS

| | | |
|---|---|---|
| 5,627,518 A | 5/1997 | Wishart |
| 5,629,669 A | 5/1997 | Asano et al. |
| 2005/0073433 A1 | 4/2005 | Gunderson et al. |
| 2005/0134441 A1 | 6/2005 | Somuah |
| 2008/0252444 A1 | 10/2008 | Batot et al. |

FOREIGN PATENT DOCUMENTS

| | | |
|---|---|---|
| EP | 0441576 A2 | 8/1991 |
| EP | 2128648 A1 | 2/2009 |
| WO | 2011035799 A1 | 3/2011 |

*Primary Examiner* — Omeed Alizada
(74) *Attorney, Agent, or Firm* — Bejin Bieneman PLC

(57) ABSTRACT

A collision warning apparatus, mountable in a vehicle to detect collision threat levels between the host vehicle and an object or target detected forward of the host vehicle. All processing and signal generation takes place in a controller in the housing without reliance on external signals, except for input power, from the host vehicle. The controller activates visible and/or audible indicators on the housing to alert the driver of the collision threat level.

12 Claims, 19 Drawing Sheets

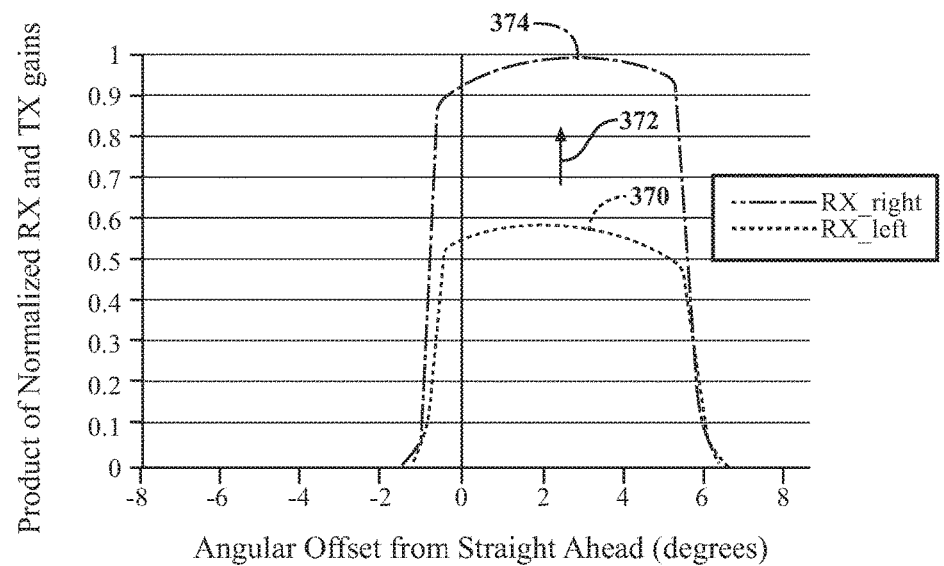
FIG. 19B
FIG. 25
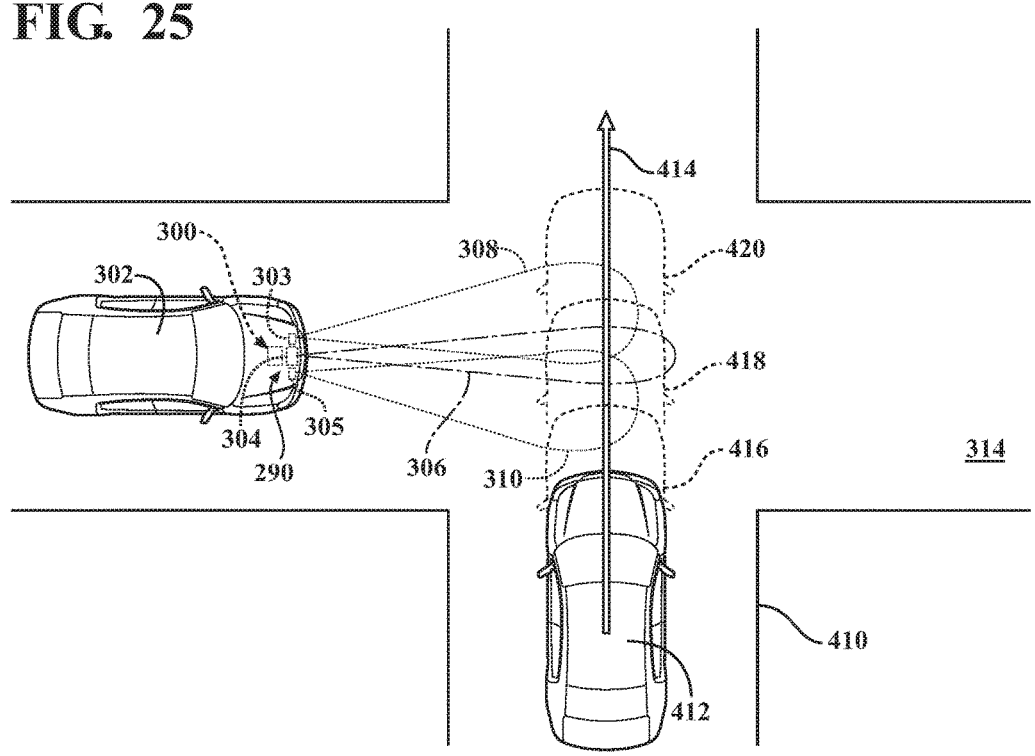

PORTABLE COLLISION WARNING APPARATUS

CROSS REFERENCE TO CO-PENDING APPLICATION

This is a continuation-in-part of U.S. application Ser. No. 13/959,140 filed Aug. 5, 2013 which claims priority benefit to the Aug. 3, 2012 filing date of U.S. Provisional Patent Application Ser. No. 61/679,246, both filed in the names of Steve A. Safie and Charles Rashid, for a Portable Collision Warning Apparatus, the entire contents of both of which are incorporated herein in their entirety.

BACKGROUND

Radar based collision warning systems are becoming prevalent in today's vehicles. Such systems detect vehicles or objects to the front, rear and sides of a vehicle to alert the driver of a close object or vehicle that could cause an imminent collision.

However, such radar based collision warning systems are permanently installed as part of the vehicle electronics.

What is needed is a portable collision warning system that may be adapted to any vehicle including the aftermarket for older vehicles.

SUMMARY

A vehicle collision warning apparatus is mountable in a vehicle. A control is coupled to a sensor. The sensor generates at least a center beam to detect an object external of the vehicle.

Using signals from the sensor, the control determines the distance, direction and the relative acceleration between the vehicle and a detected object external to the vehicle, and activates at least one of a visual and audible indicator, carried by the housing, indicating the potential for a collision between the vehicle and the detected object.

The control has only a power connection to the vehicle.

The control may have a processor executing a stored control program.

The sensor can be a radar. The radar can include a center located transmitter and a receiver arranged in one or more transmitter-receiver pairs.

In another aspect, a control coupled to a sensor. Both the control and the sensor are mountable in a vehicle. The sensor generates a center transmit beam to detect an object external of the vehicle and has first and second receiver beams laterally offset on opposite sides of the center transmit beam.

The control determines the position of an object detected forward of the host vehicle to the left, right or centered with respect to the host vehicle depending on a relative difference of the signal strength of the return signals received by the first and second receivers.

In one aspect the center transmitter generates an 11° center transmit beam and the first and second receivers each generate an 8° receiver beam.

The first and second receiver signal beams can be laterally offset on opposite side of the center located transmitter beam by 3 to 4 degrees, such as by 3.5 degrees.

The center radar beam has one or more side lobes.

The receiver signal beams are arranged to partially overlap each other.

The at least one indicator can include a caution indicator indicative of an external object detected by the sensor, and an alert indicator indicative of an impending collision with the detected external object.

The apparatus can include a selector carried on the housing allowing driver selection between at least two driver preference modes of vehicle operation relative to varying a collision distance threshold.

BRIEF DESCRIPTION OF THE DRAWING

The various features, advantages and other uses of the present collision warning apparatus will become more apparent by referring to the following detailed description and drawing in which:

FIGS. 19A and 19B are graphs, similar to FIG. 16, but depicting movement of a detected object in from the left and right respectively relative to the host vehicle;

FIG. 25 is a pictorial representation of another aspect of the collision warning apparatus as shown in FIGS. 14-24, depicting a lateral path prediction mode of the collision warning apparatus.

DETAILED DESCRIPTION

Referring now to FIGS. 1-6, there is depicted one aspect of a portable collision warning apparatus 10 which can be removably mounted in a vehicle 12 to detect vehicles or objects 14 in front of the vehicle 12 within a defined field of view extending in a forward facing direction from the apparatus 10.

The vehicle 12 in which the portable collision apparatus 10 may be employed may be any type of vehicle including automobiles, trucks, buses, motorcycles, boats, recreational vehicles, and frames.

Figure 1:
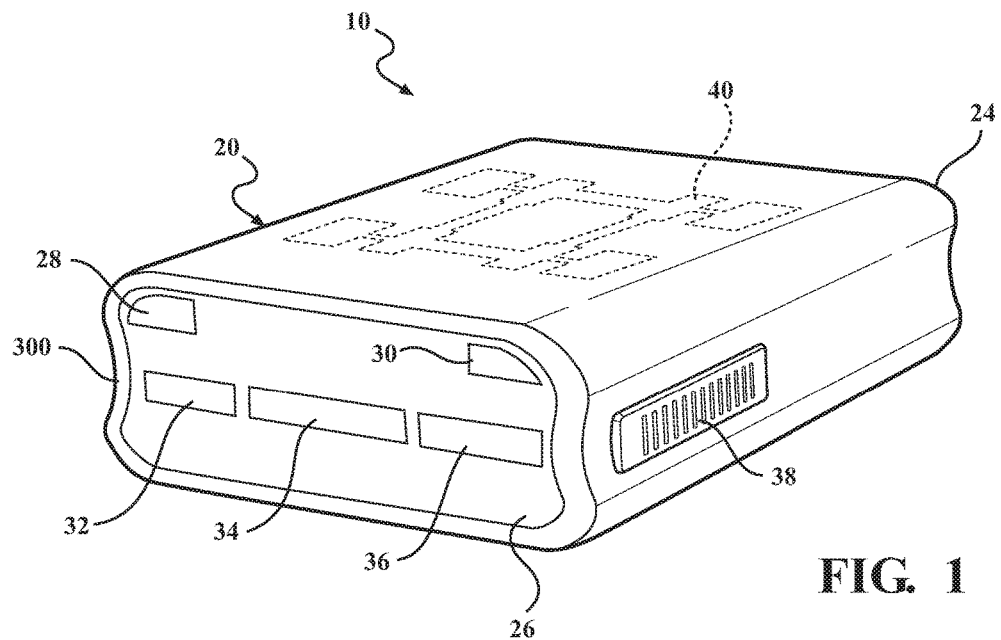
FIG. 1 is a perspective view of one aspect of a portable collision warning apparatus.
Figure 2:
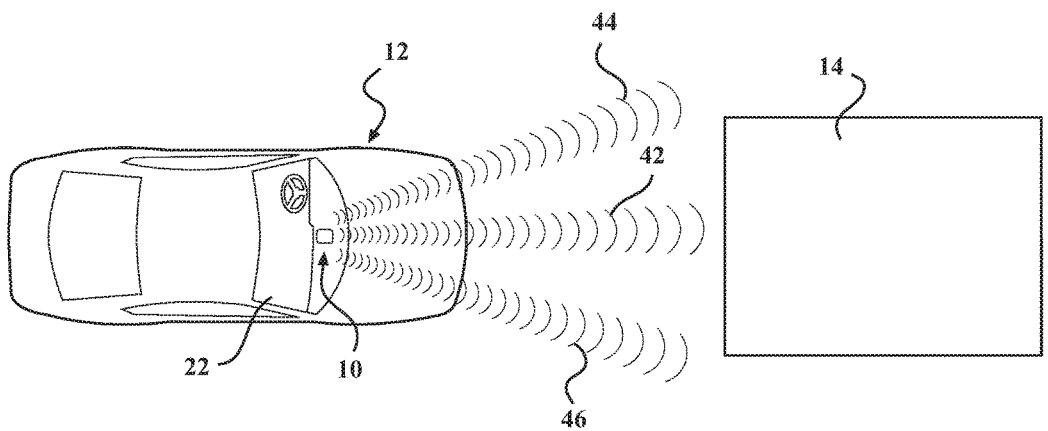
FIG. 2 is a pictorial representation of a vehicle carrying the portable collision warning apparatus shown in FIG. 1 with respect to an object located forward of the vehicle.

By way of example only, as shown in FIG. 1, the apparatus 10 can be provided in the form of a small, portable housing 20 which can be easily and removably mounted on any convenient surface in the vehicle 12, such as on the dashboard 22 of the vehicle 12, on much the same manner as current radar detectors.

The housing 20 has a forward facing end 24 and an opposed, vehicle operator end 26. The vehicle operator end 26 may include a variety of visual elements, which act alone, or in combination with audible elements contained within the housing 20 to alert the driver of various conditions surrounding the vehicle 12.

For example, a touch switch 28 with integral illumination depicting "on" is mounted in the corner of the end of the housing 20. An opposite upper corner of the end 26 includes a numeric display 30. The display 30 can depict displayed distance measurements from the front of the vehicle 12 to an object, such as another vehicle 14 located within the range of the apparatus 10.

Three different colored illuminable sections 32, 34 and 36 are also provided on the end 26 of the housing 20. The section 32 corresponds to an "active" operating status of the apparatus 10. The section 32 may be colored green to show the operator state of the apparatus 10.

The center section 34 can be colored yellow to indicate a caution state. The caution state may correspond to the location of 14 within the range of the radar of the apparatus 10, but not one whose closing distance, relative speed or other parameters, discussed hereafter, threatens an imminent collision.

The third section 36 corresponds to an "alert" state and is colored red. The section 36 is illuminated whenever a collision is imminent.

The slide switch 38 is mounted on the side of the housing 20 to control the audible magnitude of an audible or voice message device mounted within the housing 20. The audible device may provide a voice warning of precaution or alert states described above, warning beeps or increasing frequency as the distance between the vehicle 12 and the detected object 14 decreases.

The sensor 49 described hereafter may be a single sensor or a plurality of sensors. The sensor 49 may include a radar device or a light detection and ranging device (LIDAR), or combination thereof.

As described by example only, the sensor 99 includes a forward looking radar device mounted in the housing of the apparatus 10 along with the control electronics.

Figure 5:
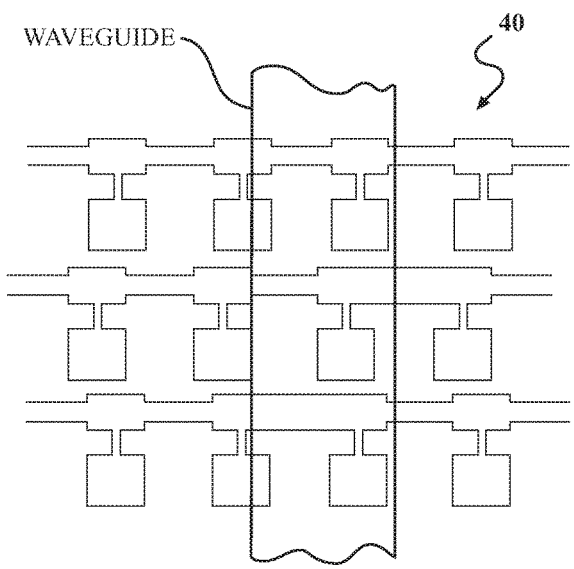
FIG. 5 is a partial pictorial representation of a micro strip array antenna mounted in the portable collision warning apparatus shown in FIG. 1.
Figure 6:
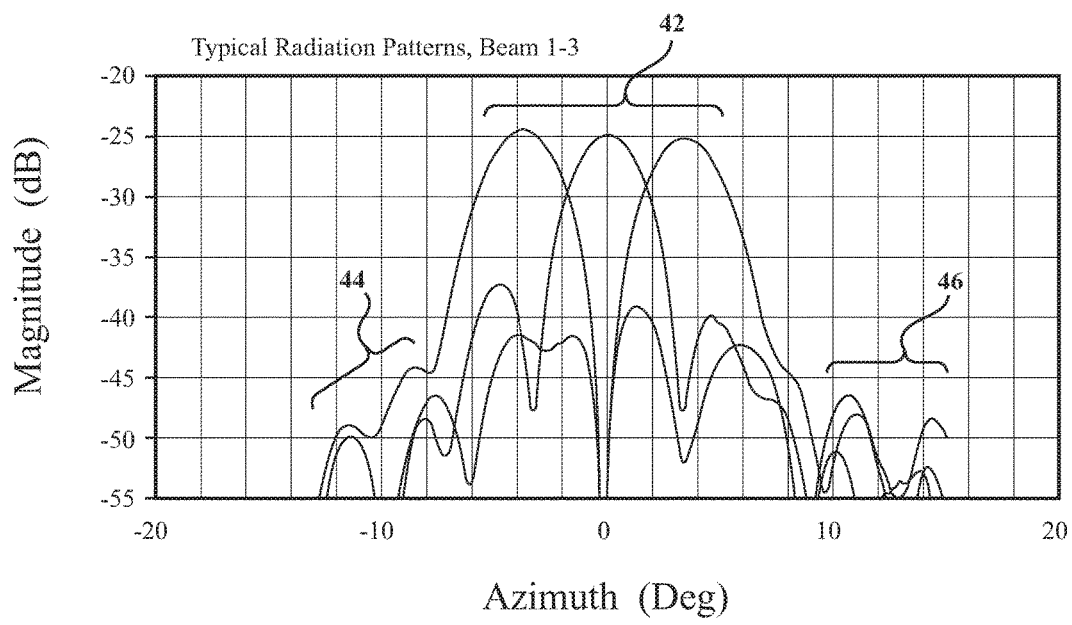
FIG. 6 is a graph depicting the radar beams generated by the apparatus shown in FIG. 1.

A flat microstrip array antenna 40, shown in FIGS. 1 and 5, is mounted on the top inner portion of the housing 20. The antenna 40 is coupled to a radar transmitter and a receiver in a front-end circuitry 41, FIG. 4, within the housing 20 to transmit and receive a center radar beam 42, formed of three side-by-side main beams, shown in FIGS. 2 and 6 and at least a pair of side lobe beams 44 and 46.

Figure 3:
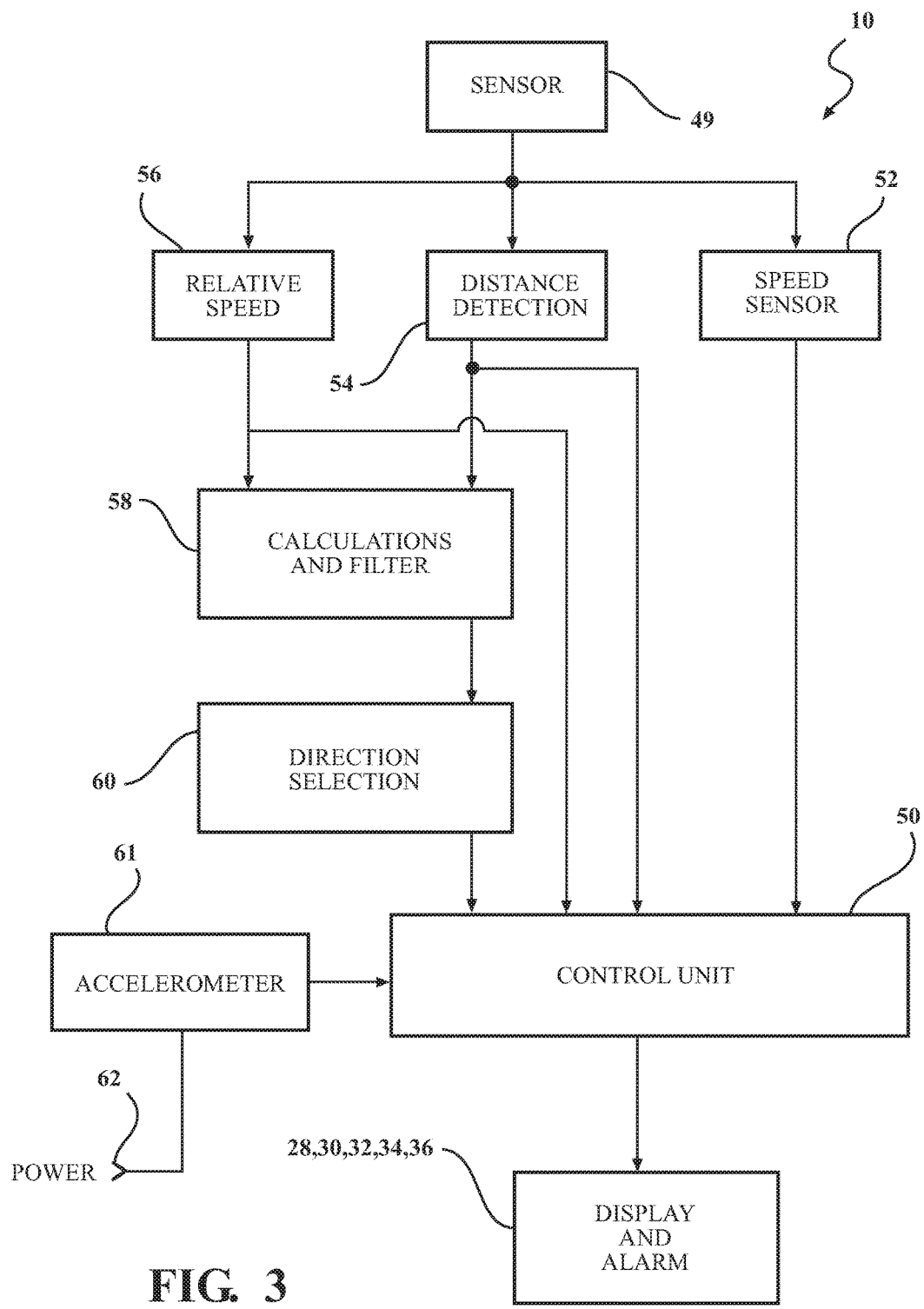
FIG. 3 is a block diagram of the collision warning apparatus shown in FIG. 1.
Figure 4:
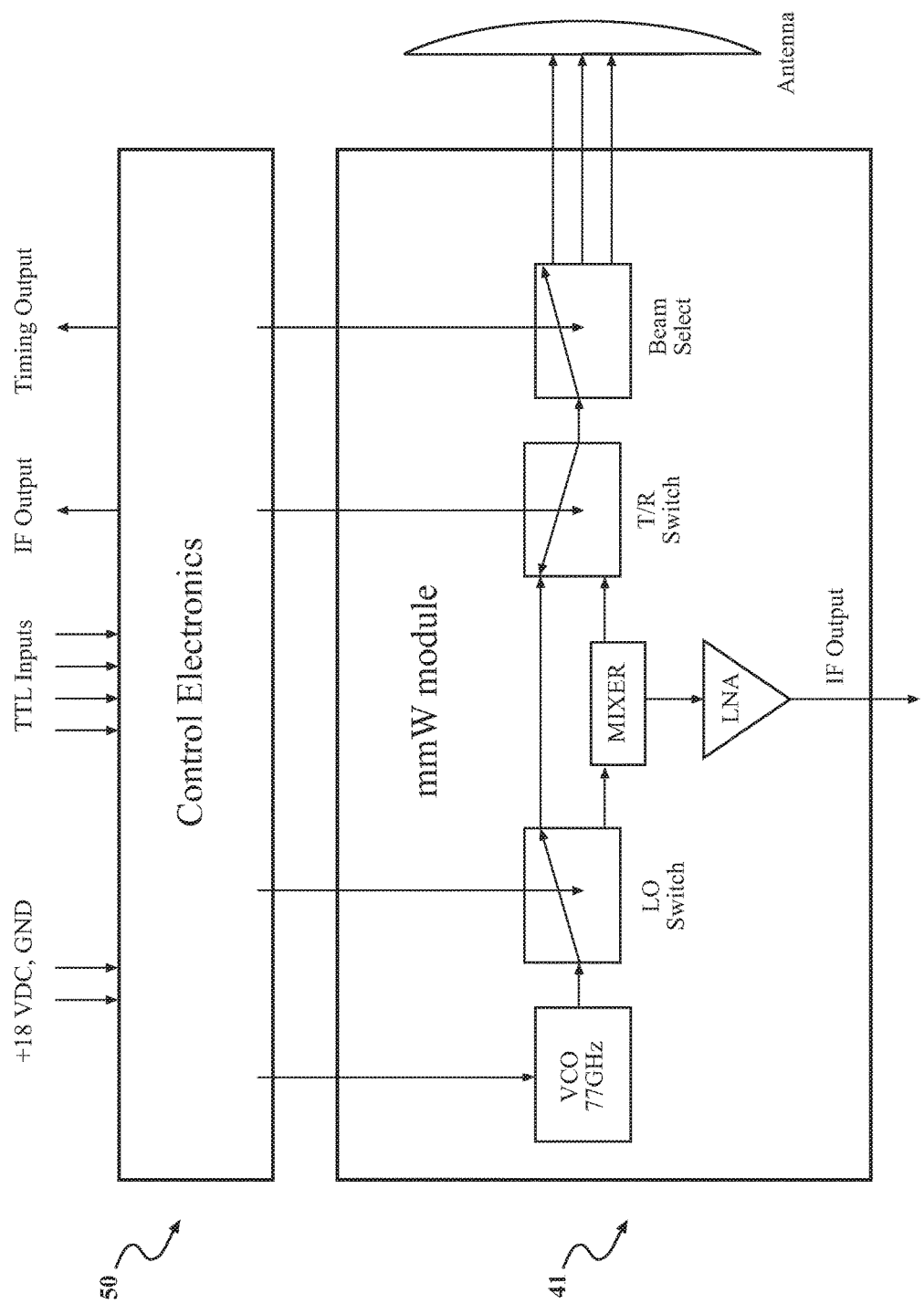
FIG. 4 is a schematic block diagram of the control unit and the antenna transmitter shown in FIG. 3.

A processor based control unit 50, shown in FIG. 3, is mounted in the housing 20. For example, the control unit 50 may be a FTF-AUT-F0290 radar based device from Freescale Semiconductor, Inc.

The control unit 50 may be any number of different electronic based devices including memory, input output signal conditioning circuits. The control unit 50 may include or be able to access a memory, which stores the control program, algorithms as described hereafter, the received radar data, as well as historic data pertaining to the vehicle, road conditions, deceleration values, and stopping distances.

The control device 50 can include a central processor as well as multiple internal or external processors, which communicate with the memory, receive various inputs, and generate various outputs as described hereafter. The processor can be part of an electronic processing device, such as a central processor unit, microprocessor, microcontroller, controller, ASIC, or any other processing device that executes software instructions that govern the collision avoidance methods described hereafter.

The control unit 50 generates a vehicle speed signal, which is the actual ground speed of the vehicle 12, which can be generated by the side lobe beams 44 and 46 reflecting off the road pavement.

The control unit 50, through the transmitter and the receiver coupled to the antenna 40, generates the main center beam 42 and determines the time elapsed between the generation of the center beam 42 and the incident or reception of a return beam from the center beam 42 striking a vehicle or object 14 in front of the vehicle 12. The control unit 50, as shown by box 54 in FIG. 3, uses the lapsed time between the transmit and receive center beam 42 signals to determine the distance between the vehicle 12 and the object or vehicle 14 detected in front of the vehicle 12.

A distance detection calculation circuit 54 can generate a decreasing distance signal between vehicle 12 and the vehicle 14, which indicates that the relative speed of the vehicle 12 is greater than the speed of the vehicle 14. Oppositely, a distance between the vehicle 12 and the vehicle 14 determined to be increasing indicates that the relative speed of the vehicle 14 in front of the vehicle 12 is increasing relative to the speed of the vehicle 12.

The control unit 50 executes algorithm-based calculations and filtering 58 to compare the relative speed calculation 56 with predetermined thresholds.

The thresholds are set to create the Active, Caution and Alert states described above for the illuminated indicators 32, 34, and 36 on the vehicle operator-facing end 26 of the housing 20.

A direction selection feature 60 is also provided by using an accelerometer 61 mounted in the housing 20 to detect motion of the vehicle 12. Only when the accelerometer 61 detects motion of the vehicle 12 above a preset speed is the control unit 50 activated. The control unit 50 operates the radar only on forward vehicle motion of a predetermined rate. When the vehicle is in reverse, the control unit 50 does not activate the radar since the accelerometer output is zero.

Similarly, when forward motion is detected by the accelerometer 61, the control unit 50 does not activate the radar until a predetermined forward vehicle speed is detected. For example, the control unit 50 can activate the radar only when the vehicle 12 is moving forward a speed greater than 10 mph.

The use of three main beams constituting the center main beam 42 uniquely enables the speed and path prediction to be generated for a vehicle or object moving laterally across the front of the vehicle 12. For use of three separate main beam sub-beams 42, the control 50 can determine from which direction and the speed of movement of the object laterally across the front of the vehicle 12. Along with the distance detection between the object 14 and the vehicle 12, the control 50 can also calculate whether the object, at its present rate of speed, will clear the path of the vehicle 12 before the vehicle 12 reaches the path of movement of the object.

For example, if an object is detected moving laterally across the front of the vehicle rather than an object 14 having an opening or closing Doppler indicating the increasing or decreasing distance from the vehicle 12, the control 50 can predict the path of the object 14 by knowing its distance from the vehicle 12 and its rate of speed, and can determine whether or not a collision is imminent between the vehicle 12 and the object 14. The control 50 then takes appropriate action with respect to the indicators 32, 34 and 36 to advise the vehicle drive of a collision status with the laterally moving vehicle.

The antenna front-end circuitry is provided with engine noise suppression calculation, which suppresses electrical noise created, by the engine windshield wipers, fans and other electrically operated equipment within the engine, including the engine spark plugs. For given signal to noise ratio established for the radar front end 41, without the engine running, the control 50 will provide a floating filter calculation suppressing noise outside of the established signal to noise ratio thereby minimizing any possibility that such engine noise will interfere with or distort the signals generated by the radar antenna 40.

The control unit 50 receives power through a plug in connector and cord 62 which can be attached to a suitable power outlet in the vehicle 12, such as a cigarette lighter, a dedicated power connection, etc. Alternately, the housing 20 can be provided with storage batteries or rechargeable storage batteries for internal power generation.

In use, the housing 20 is mounted in the vehicle 12 in a suitable location so that the forward facing end of the vehicle 24 is clear of obstructions and faces forward of the vehicle 12, preferably along the longitudinal center line of the vehicle. The power cord connector 62 is attached to the electrical system of vehicle 12 to supply power to the control unit 50. This is the only connection to the vehicle 12. No vehicle parameters, operating signals, etc. are supplied to the apparatus 10.

As described above, the control unit 50 activates the radar only when the vehicle 12 is moving forward at speeds greater than a predetermined speed, such as greater than 10 mph. During forward motion movement of the vehicle 12, the control unit 50 continually generates the center radar beams 42 and the side lobes 44 and 46.

When an object or vehicle 14 is detected by use of the center radar beam(s) 42, the control 50 calculates the distance between the vehicle 12 and the detected vehicle or object 14, determines the actual speed of the vehicle 12 from the speed calculation sensor 52, and then calculates the relative speed between the vehicle 12 and the detected vehicle or object 14.

The control unit 50 then activates the appropriate indicator 32, 34, 36 on the housing 20 depending upon a comparison of the relative speed and predetermined closing speed thresholds.

Referring now to FIGS. 7-13, there is a depicted another aspect of a portable collision warning apparatus 100. The apparatus 100 is similar to the collision warning apparatus 10 but includes additional functionality and modes of operation as described hereafter.

The apparatus 100 has a portable housing as shown in FIG. 1 with the same switches and indicators described above and shown FIG. 1.

The apparatus 10 is configured for removably mounting in the vehicle 12, such as on the dashboard of the vehicle immediately adjacent to the vehicle windshield.

Figure 8:
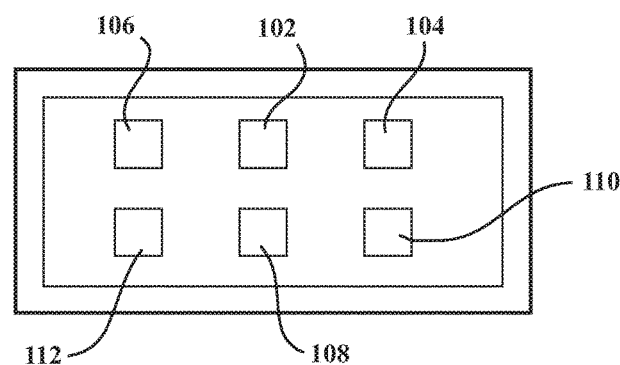
FIG. 8 is a block diagram of one aspect of an antenna transmitter and receiver module using three separate radar transmitters and receivers.
Figure 9:
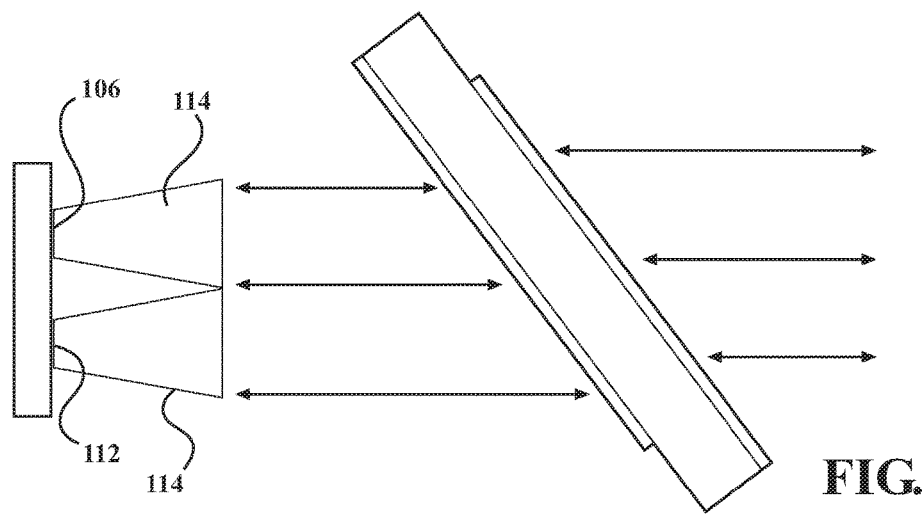
FIG. 9 is the side elevational view of the antenna transmitters and receivers shown in FIG. 8.

In this aspect, the apparatus 100 includes a plurality of sensors, which may be, by example, individual radar transmitters 102, 104 and 106 and matching receivers 108, 110 and 112 arranged in a transmitter and a receiver pair. The radar transmitters and receivers 104-112 may be microarray antennas or radar horn units as shown by example in FIG. 9. The transmitters and receivers are mounted on one end of the housing and open externally of the housing in matched pairs as shown in FIG. 8. The horns 114, in one aspect, project from each transmitter and receiver pair, such as the transmitter and the receiver 106, 112 shown in FIG. 9.

Each transmitter 102, 104 and 106 is configured for generating a main center frequency beam, such as hereafter referred to as a center main beam 120 for the center mounted transmitter 102, a left main beam 122 from the left most transmitter 104 and a right main beam 124 from the right most transmitter 106. In addition, each transmitter beam as one or more side lobes which can be used to determining target position and path prediction for laterally moving targets.

Figure 7:
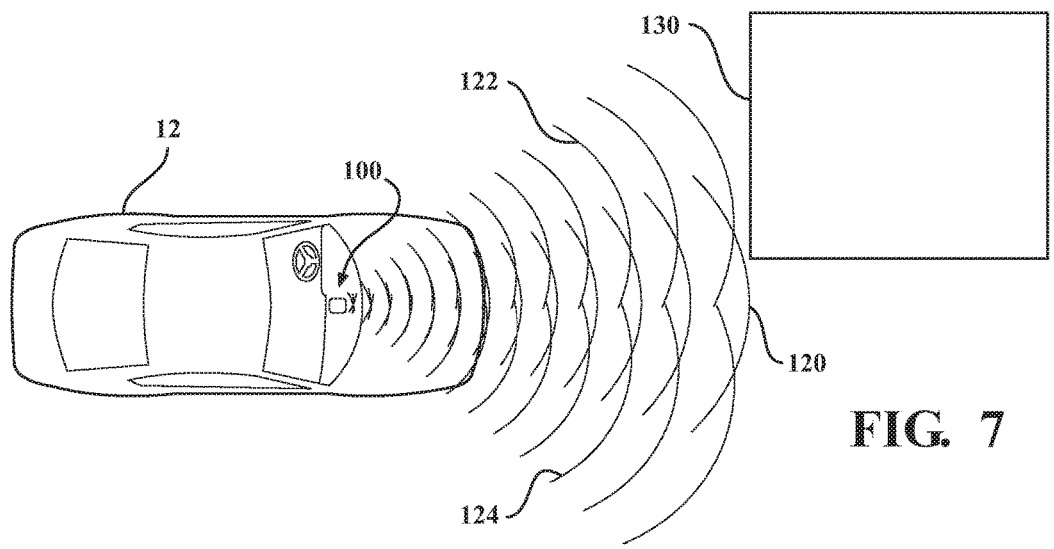
FIG. 7 is a pictorial representation of another aspect of a portable collision warning apparatus mounted in a vehicle carrying the portable collision warning apparatus as shown in FIG. 1 with respect to an object located forward of the vehicle.

As shown in FIG. 7, the beams 120, 122, and 124 have a predetermined range, such as 120 meters as well as a predetermined degree of overlap, such as a 10-20 degree overlap shown by example in FIG. 1.

The use of three center beams 120, 122, and 124 enables the apparatus 100 to determine a lateral path prediction of an object detected externally to the front of the vehicle 12, such as the object 130 shown in FIG. 7 which can, for example, be a vehicle moving in the same or opposite direction than that of the vehicle 12.

It should also be noted that transmitter and receiver pairs could normally operate only on the center channel using the transmitter receiver pair 102 and 108, with the left and right transmitter and receiver pairs 104, 110 and 106, 112 being utilized on road curves based on speed and lateral acceleration data from an accelerometer.

Figure 10:
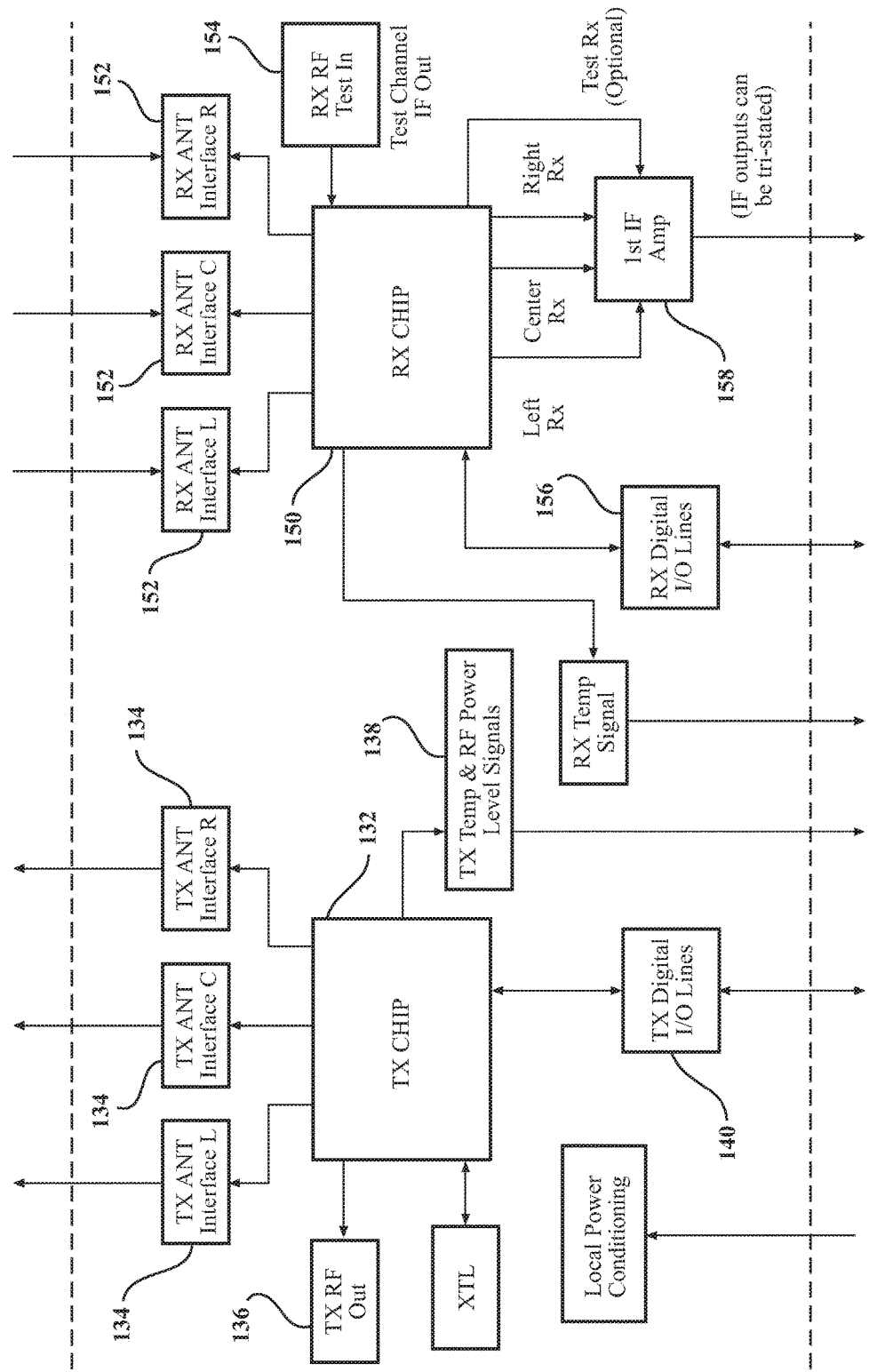
FIG. 10 is a block diagram of the radar transmitter and receiver circuitry.

The transmitters 102, 104, 106, are a transmitter circuit or chip 132, shown in FIG. 10. Various inputs and outputs are coupled to the transmitter chip 132, such as left center and right transmitter antenna interfaces, all referred to by reference number 134, a transmitter test output signal 136, transmitter temperature and RF power level signals 138, and transmitter digital I/O 140.

Each transmitter 102, 104, and 106 operates as a frequency modulated continuous wave radar pair with a sweep frequency such that a target range of 120 meters results in an IF frequency of about 500 KHz. Shorter distance target ranges translate to lower frequencies.

The radar receivers 108, 110, and 112 are coupled to a receiver circuit or chip 150 by receiver antenna interfaces 152 for each of the center, left and right transmitter receiver pairs or channels. A receiver RF test input signal 154 is coupled to receiver circuit 150. Inputs and outputs to the receiver circuit 150 include receiver digital I/O lines 156 as well as a first IF amplifier 158 that receives the radar signal received by the receiver circuit 150 from each of center left and right receivers 108, 110, and 112.

Figure 11:
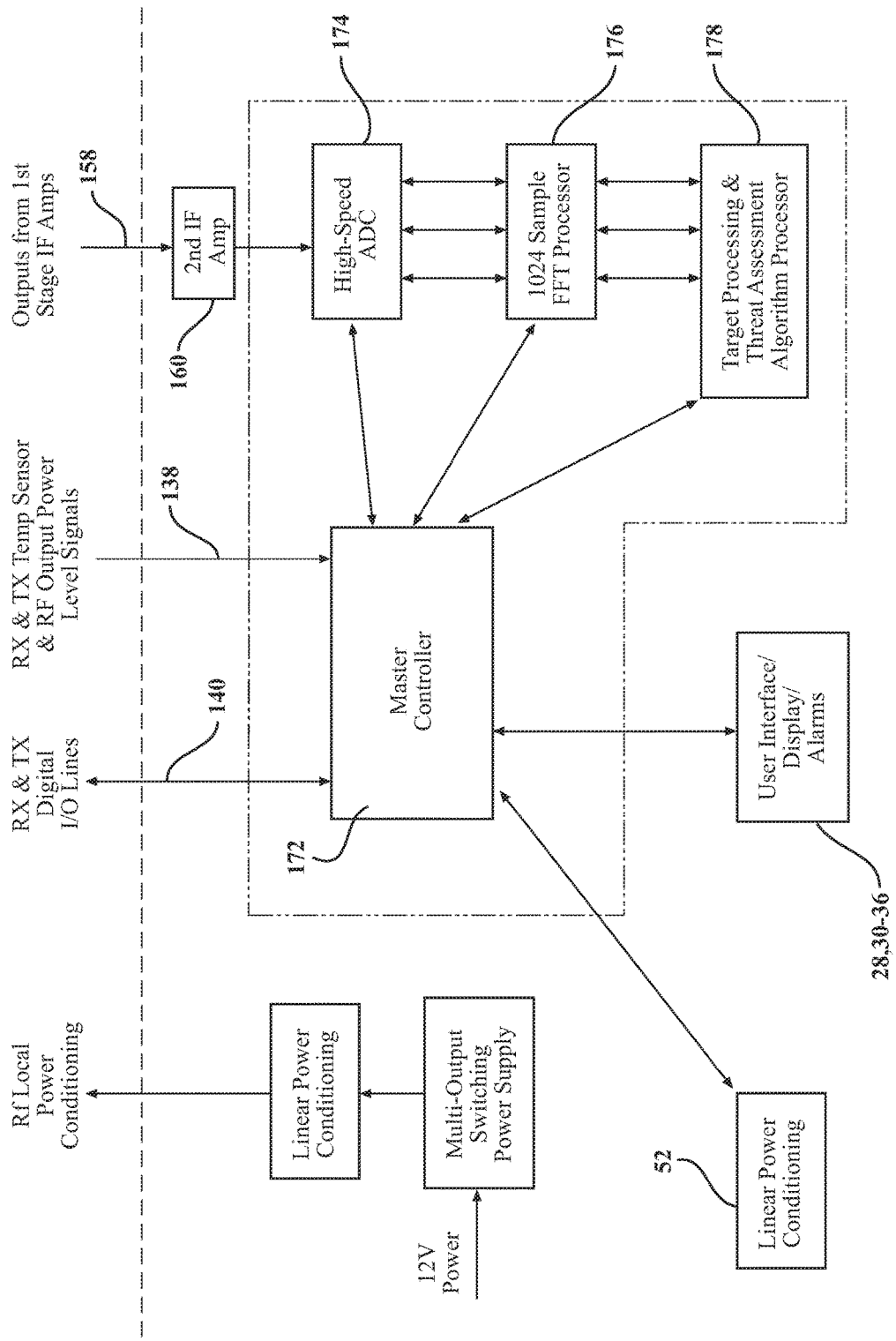
FIG. 11 is a block diagram of the control electronics module of the portable collision warning apparatus shown in the other aspect of the portable collision warning apparatus shown in FIG. 7.

As shown in FIG. 11, a second IF amplifier 160 may be coupled in a series with the output of the first IF amplifier 158.

As shown in FIG. 11, a control 170 operates the various elements of the apparatus 100. The control 170 is formed of master controller 172 that may be similar to the control shown in FIG. 1 insofar as being formed of any electronic circuit or device including one or more processors executing a stored control program.

Either as an integral part of the master controller 172 or by interfaces with external circuits the master 172 provides additional functions, such a high speed ADC 174, a FFT processing 176, and a target processing and threat assessment algorithm processing 178. All of the additional functions 174, 176 and 178 may be provided by separate circuit elements or processors, or be implemented by the master controller 172 processor.

Figure 12:
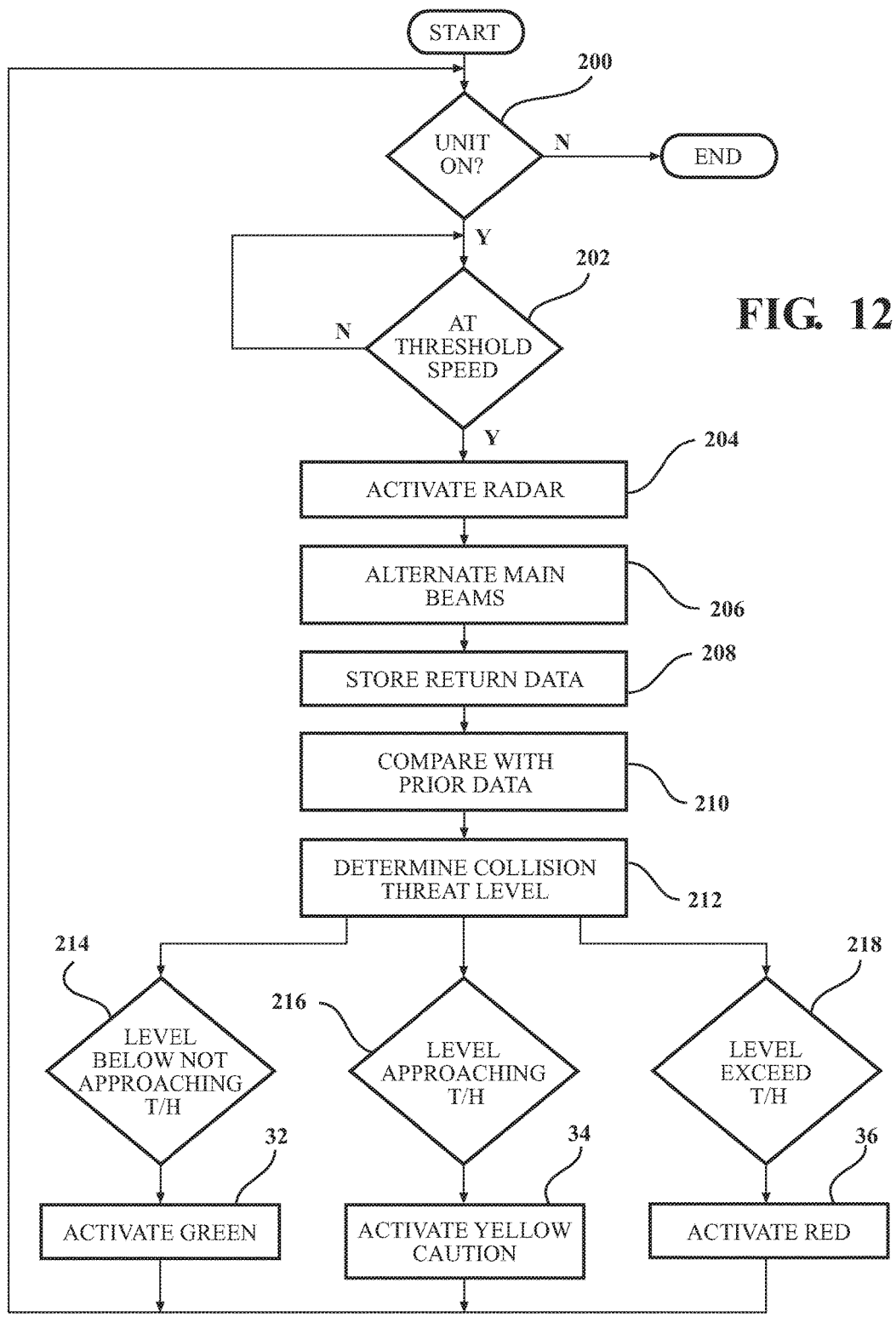
FIG. 12 is a flow diagram depicting the sequence of operation of the control electronics of the portable collision warning apparatus shown in FIG. 7.

Referring now to FIG. 12, there is depicted a sequence of steps performed by the master controller 172 to detect an external object forward of the vehicle 12 and to determine whether a collision threat level warning should be issued, if necessary.

In step 200, a determination is made if the unit 100 is turned on. Next, in step 202, the master controller 170, using the accelerometer 52 determines if the vehicle 12 is at a threshold speed, such as 10 miles per hour in a forward direction. The master controller 172 does not activate the radar transmitters 102, 104 and 106 until the threshold speed is met or exceeded in step 204. The master controller 172 alternates the main beams 120, 122 and 124 of the center transmitter 102, the left transmitter 104, and the right transmitter 106 in step 206. Although any sequence of transmitter activation can be employed, for example, the master controller 172 activates the center transmitter 122, then the left transmitter 104, then the center transmitter 102 again, then the right transmitter 106, etc. in a continuous sequence.

Figure 13:
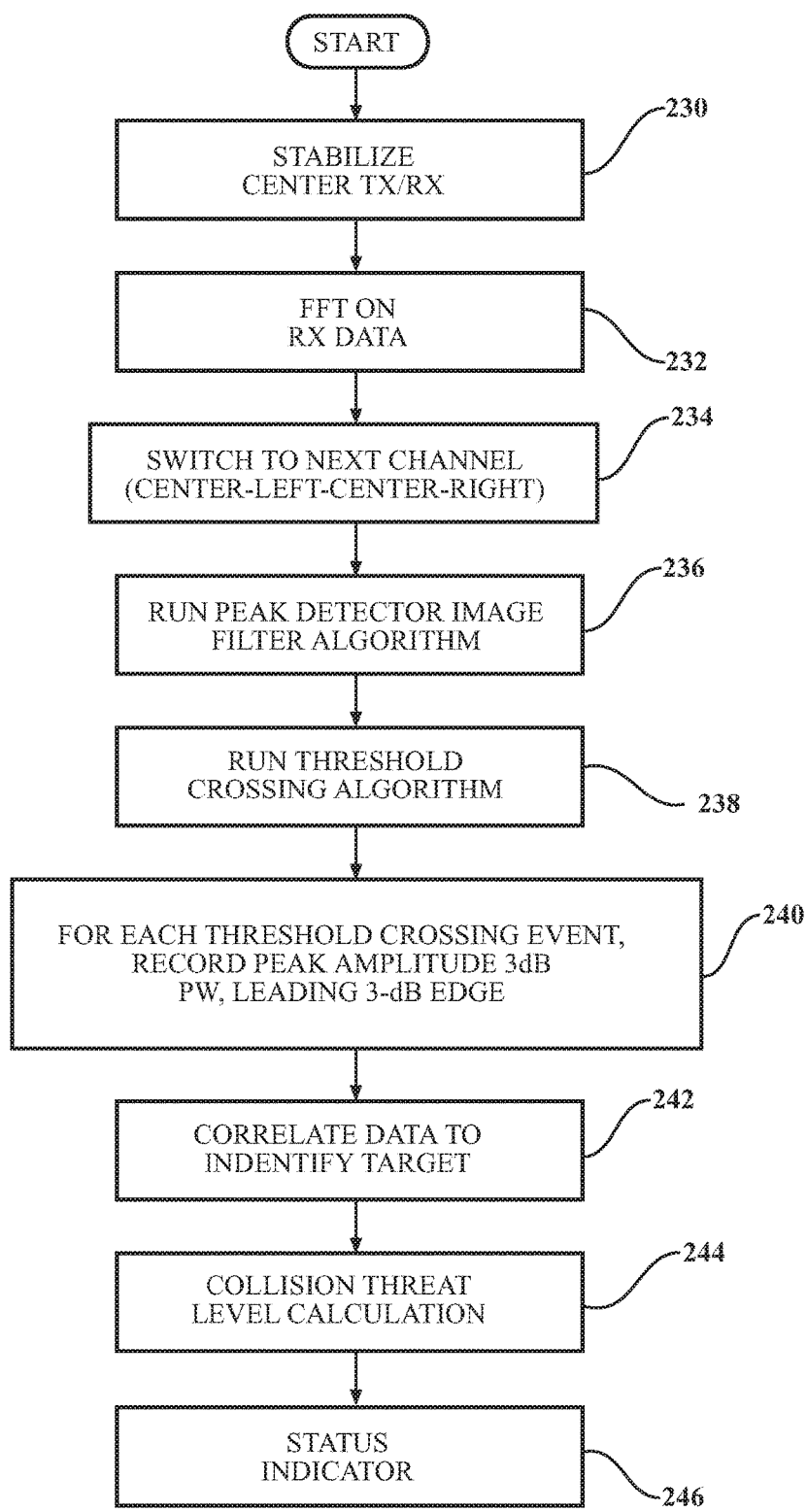
FIG. 13 is a flow diagram depicting the warning calculation sequence executed by the portable collision warning apparatus shown in FIG. 7.

When a particular transmitter, such as transmitter 102, is activated, only the associated matched receiver, such as receiver 108, is activated by the master controller 172 to receive signals reflected from any object, such as object 130, in the path of the main center beam 120 and its side lobes. This return data is stored in step 208, and compared with prior data from any receiver 108, 110, 112 to enable the master controller 172, in step 212, to make a collision threat level determination. For example, as shown in FIG. 13, the master controller 172, executing the control program, and starting with the center transmitter 102 and the receiver 108, stabilizes the center transmitter 102 and the center receiver 108. The master controller 172 executes an ADC and a 1024 sample Fast Fourier Transform on the received data in step 232 to clean up the data. The master controller 172 then switches to the next channel in the center, left, center, right, center, etc. sequence described above for the transmitters and receivers.

In step 236, the master controller 172 runs a peak detector image filter algorithm. Next, in step 238, the master controller runs a threshold crossing algorithm. In step 240, for each threshold crossing event, the master controller 172 records and stores in the memory, the peak amplitude the 3 dB (PW) center frequency, and the leading 3-DB edge. In step 242, this data is correlated with previous data for the same target to enable a collision threat level calculation to be done in step 244. Based on the outcome of the collision threat levels calculation in step 244, the master controller 172 activates the appropriate alert indicator 32, 34, or 36 in step 246.

As shown in FIG. 12, if the collision threat level is below or not approaching the threshold in step 214, the master controller 172 activates the green or normal driving condition indicator 32. In step 216, if the collision threat level is approaching the threshold, but not yet matching or exceeding the threshold, at a preset distance, the master controller 172 will activate the yellow or caution indicator 34. Only when the calculated collision threat level exceeds the threshold in step 218, does the master controller 172 activate the red warning indicator 36.

A digital signal from each transmitter 102, 104 and 106 switches high at the beginning of an up-chirp of the ramp-like triangular modulated continuous wave and low at the beginning of a down-chirp so that sampling between the selected center left or right transmitter and receiver pair can be synchronized.

The master controller 170 polls a Trig ADC (FM-CW_Sync) signal until it toggles from low level to high. The master controller 172 then executes the delay after the toggle change of state so that the radar frequency or IF can stabilize after any discontinuity. Then, sampling of 1,024 samples at a 1 microsecond rate for each side of the ramp takes place. The master controller 172 executes a 1024 FFT to calculate the strength of each of the 512 range bins of data.

After completion of the samples on the down-chirp, the master controller 172 switches the activated transmitter/receiver pair to the next channel as described above. The ramp length or delay for synchronizing the next transmitter/receiver pair is made long enough to allow stabilization of the next channel before the next sample time.

The master controller 172 then runs a peak detector image filter algorithm from the 512 points in the range bend to achieve at least some signal processing gain. The master controller 172 then executes a threshold running algorithm on the process data to identify potential targets, separately on each up-chirp and down-chirp. For threshold crossing events, or potential targets, the master controller 172 records three parameters, namely, peak amplitude, 3 dB_PW, and leading 3-dB edge.

The master controller 172 then correlates data from the up/down chirp to identify candidate targets. Specifically, the master controller 172 analyzes the leading 3 dB range bins within maximum doppler ship (+2 max speed doppler for closing targets and −1 max speed doppler for receding targets), peak amplitude similar within + or −X dB, 3 dB PW similar values and the specific left center or right channel of observation.

For each candidate target, the master controller 172 maintains the following attributes:
 1. Range=average of leading 3 dB bins of up/down
 2. Amplitude=average up/down peak amplitudes
 3. Doppler closing measure=(down-chirp leading 3 dB bin) minus (up-chirp leading 3 dB bin)
 4. Pulse-Width=average of up/down 3 dB Pulse-Width
 5. Channel of observation (L,C,R)

Update "Old Target List" Attributes:
(Each target on the list will have a 4-column matrix of values, one for each channel (L, C, R) and one for all channels merged (M), Column values for channels in which the target is not observed are ignored and reset. The "Old Target List" processing will have a merge/un-merge procedure. If the attributes in one channel deviate too much from the merged value, the old target will be broken out into multiple targets. History is retained from the old merged target. Unique targets will be merged into a single target if their attributes become similar.)

Next, the master controller 172 correlates candidate targets with old targets based on store data or adds new targets to the list using the following criteria:
1. Is range similar to old target predicted range (+/−4%)
2. Is amplitude similar to old target amplitude (loose limits)
3. Is PW similar to old target PW (loose limits)
4. Is Doppler similar to old target Doppler (+/−1.5 g?)

If correlated with an old target,
  a. Update target predictions for next sample.
  b. Rest staleness counter to zero
  c. Increment observation counter If un-correlated with old target, add to old target list and initialize parameters.

Next, the master controller 172 updates the host vehicle 12 speed, linear acceleration, and direction of travel estimate. For the speed determination, the master controller 172 uses information from:
  a. Previous speed estimate and previous longitudinal acceleration estimate
  b. Combine with integrated longitudinal accelerometer data
  c. For out-of-lane targets, modify with Doppler of targets for which Doppler is much greater than actual range bin change history and actual range closing rate is small
  d. For in-lane targets, modify with Doppler of targets, which had been observed several samples, but were subsequently removed from "Old Target List" because of staleness. This indicates road surface clutter that fell below the field-of-view and should be a good indicator of actual host vehicle speed.

For longitudinal acceleration, the master controller 172 updates historical data with new accelerometer sample data.

For the direction of travel, the master controller 172 uses speed and current lateral acceleration to calculate the direction of travel. It should be noted that the direction of travel is used when determining if the target is in lane or out of lane on a roadway. The master controller 172 than processes the old target list to identify collision threats using the following criteria.
1. If staleness counter>staleness threshold count, delete target from list.
2. If observation counter<minimum observation counter, skip until next sample.
3. Determine "in-lane/out-of-lane" and skip "out-of-lane" targets until next sample. (See separate description of geometric/trigonometric procedure incorporating longitudinal acceleration and target Doppler rate-of-change.)
4. If estimated Doppler is receding, skip until next sample.
5. If estimated range closing rate is receding, skip until next sample.
  a. Secondary processing for safe following speed for "in-lane" targets (4 &5). This is just a look-up function of range and host vehicle speed.
6. If amplitude<minimum amplitude, skip until next sample, (Minimum amplitude may be range and/or "limited visibility dependent.)
7. All remaining targets are processed for threat level.

The collision threat processing calculation will depend upon a driver-selected switch 300, shown in FIG. 1, in the form of a push button or slide switch mounted on an external surface of the housing 20, such as on one side of the housing 20 as shown in FIG. 1. The driver selection switch 300 is switchable between normal, aggressive, and non-aggressive position, which are input to the master controller 172.

Next, the master controller 172 calculates a collision threat level using:
1. Using speed, range, and acceleration data, calculates a prediction of range and closing speed one "reaction time" into the future. (Possibly guard-ban the range a little.)
2. Calculate the rate of deceleration required to avoid a collision, "g_avoid".
3. Alert the driver based upon the worst-case "g_avoid".

The following describes the formulae for calculating the braking deceleration required to avoid collision with a closing target, "g_avoid". (Units are in feet and seconds but can be converted as appropriate.)

Given Information:

$r_0$=estimated ranged to the target from the radar signal processing at the time of the calculation units: feet $d_{gb}$=guard band distance, a constant to account for range uncertainty, units: feet $v_0$=estimated closing speed from the radar signal processing at the time of the calculation, "+" indicated a closing target (ranges becoming similar) and "−" indicates a receding target (ranges getting larger), units: feet/second $a_0$=estimated deceleration rate from on-board longitudinal accelerometer data, "+" indicates braking/deceleration, "−" indicates speeding up/acceleration, units" feet/second^2.

$t_r$=driver reaction time, a parameter associated with the driver selected settings for the driving environment, units: seconds. Proposed values are 0.1 for the skilled alert driver with good visibility, 0.1 for normal operation, and 0.3 for driver skills or conditions below average.

$g_{thresh}$=required deceleration alert threshold, a parameter associated with the driver-selected settings for the driving environment, units: feet:second^2. Proposed values, in terms of g-loads, are 0.35 for slippery surfaces and vehicles with long stopping distances, 0.45 for normal drive, and 0.55 for dry road conditions and vehicles with excellent braking capability. Converting from g-loads to feet/second^2, the proposed parameter values are 11.3, 14.5 and 17.7 ft/sec^2 respectively.

The collision threat level processing will manipulate the above data to calculate the braking deceleration required to avoid a collision with the target, g_avoid. Once the g_avoid is calculated, it is compared with the $g_{thresh}$ value to determine what type of driver alert is appropriate. If g_avoid is greater than $g_{thresh}$ an audible alarm part of the alert.

The derivation of the calculation is as follows:
After one reaction time, the range to the target and the closing speed are:

$$d(t_r) = r_0 - t_r*(v_0 - a_0/2) - d_0, \text{ accounting for range uncertainty and presuming the target is not maneuvering.}$$

$$v_{tr} = v_0 - a_0*t_r$$

After one reaction time, the value for g_avoid is the deceleration required to get to zero closing speed within the available distance. This can be calculated as:

$$g\_avoid = (v_{tr})^2/(2 * d_{tr})$$

Substituting the values known at the time of the decision processing, $$g\_avoid = 0.5 * (v_0 - a_0 * t_r)^2 / (r_0 - t_r * (v_0 - a_0/2) - d_{gb})$$

Referring now to FIGS. 14-25 there is depicted another aspect of a collision warning apparatus 290 which provides forward looking collision avoidance threat indicators as well as discrimination between in-lane and adjacent lane potential threats, such as the ability to discriminate between threats entering the lane occupied by the host vehicle from the left or right and those leaving the lane to the left or right. This aspect of the collision warning apparatus also enables detected object lateral path prediction to assist in the threat prediction.

Figure 14:
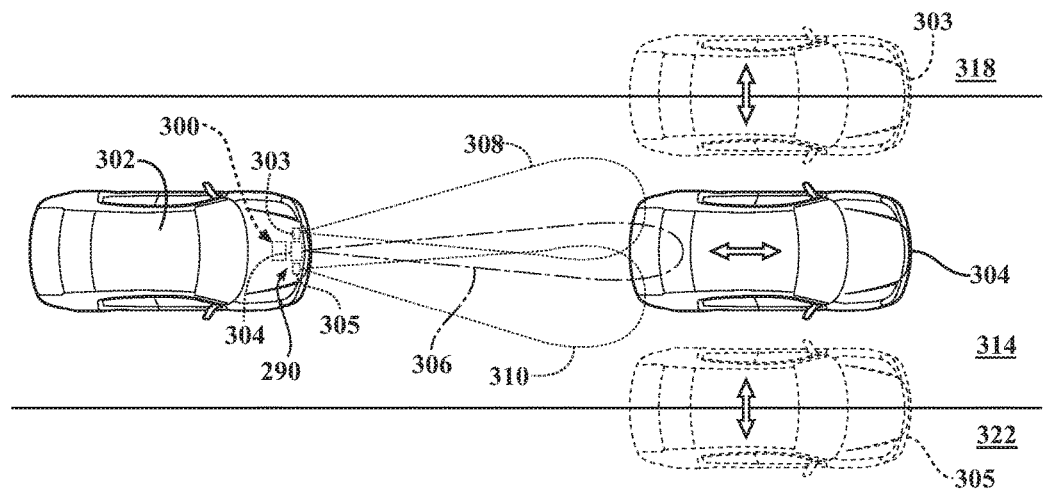
FIG. 14 is pictorial representation of another aspect of a collision warning apparatus.
Figure 15:
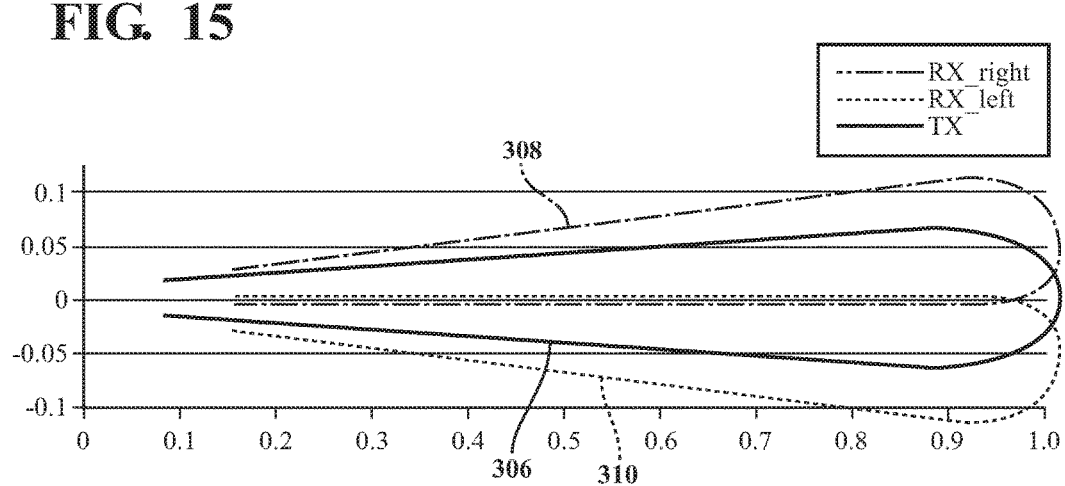
FIG. 15 is a graph depicting the center transmitter and a pair of receivers beam patterns.

As shown in FIG. 14, and in greater detail in the remaining FIGS. 15-25, a controller 300 is mounted in a host vehicle 302, along the vehicle center line typically in a forward position on the host vehicle 302. The controller 300 controls and a transmitter 304 mounted along the centerline of the host vehicle 302. The transmitter 304, similar to the transmitters described in previous aspect of the collision warning apparatus, has an 11° beam width transmit antenna, for example, which generates a main center beam 306 forward of the host vehicle 302.

A pair of receivers 303 and 305, which may have an 8° beam width receiver antenna, are angularly offset respectively to the left and right of the transmitter 304 by a 3° to 4° beam offset, such as a 3.5° offset. Beam patterns 308 and 310 for the left and right receivers 303 and 305 respectively, depict the return signal reflected by a detected object or vehicle 312, forward of the host vehicle 302.

In the following description, the detected object 312 forward of the host vehicle 302 will be described as being in-lane or in the same travel lane 314 as the host vehicle 302 on a road or highway. The detected object 312 can also assume a plurality of left movement positions shown by the arrow or be completely in left lane 318 relative to the center lane 314 of travel of the host vehicle 302. Similar, the detected object 312 can assume a plurality of right lateral positions including partially or completely in a right lane 322 relative to the center lane 314.

As shown in FIG. 14, the transmit beam 306 and the return beams 308 and 310 are arranged with a degree of overlap between the center located transmit beam 306 and each of the return receiver beams 308 and 310. The return receiver beams 308 and 310 are also overlapped with respect to each other, as describe hereafter.

For a target with a given radar cross-section, the relative signal amplitudes are proportional to the product of the transmitter beam and the particular receiver channel beam at the annular offset of the target. These products are shown in an example in FIG. 16.

Figure 16:
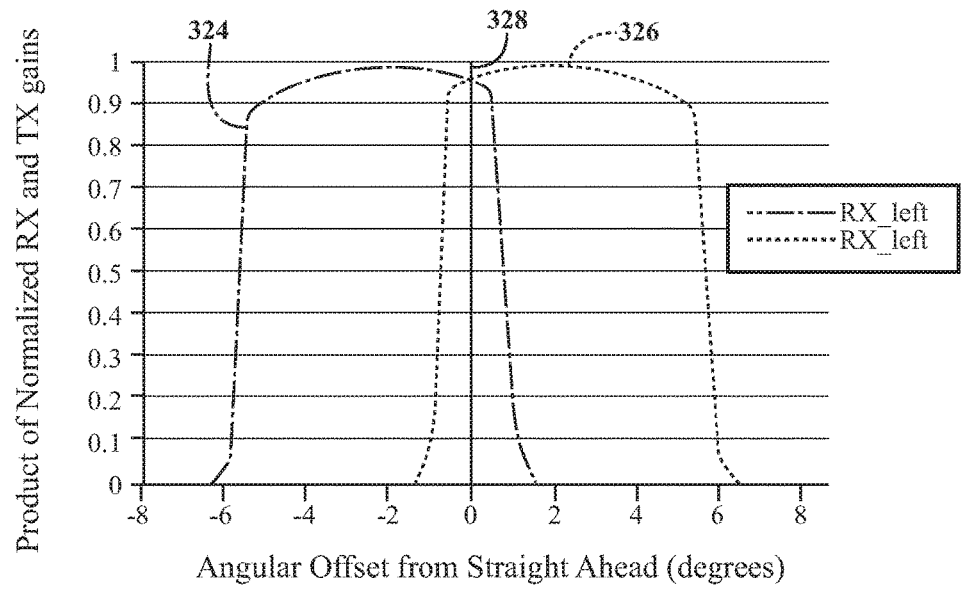
FIG. 16 is a graph depicting a normalized product of receiver angular offset.

As shown in FIG. 16, the normalized product of the receiver and the transmitter beams verses the annular offset of the receivers 303 and 305 is shown by two waveforms 324 and 326 relative to a center line 328 corresponding with the center position of the center transmit beam 306. The waveforms 324 and 326 depict the product of the normalized receiver and transmitter beams for the left receiver 303 depicted by wave form 324 and the right receiver 305 by the wave form 326.

In FIG. 16, the wave forms 324 and 326 are depicted as being substantially equal in amplitude as would occur when the detected object 312 is general centrally located forward of the host vehicle 302 as shown the detected object 312 in FIG. 14. The reflected receiver beams 308 and 310 have essential by the same amplitude; but are annularly offset from the straight ahead projecting center transmit beam 306 as described above.

This configuration of a single center located transmitter 304 and angularly offset first and second receivers 303 and 305 generates a number of possibility for increased threat detection.

Figure 17A:
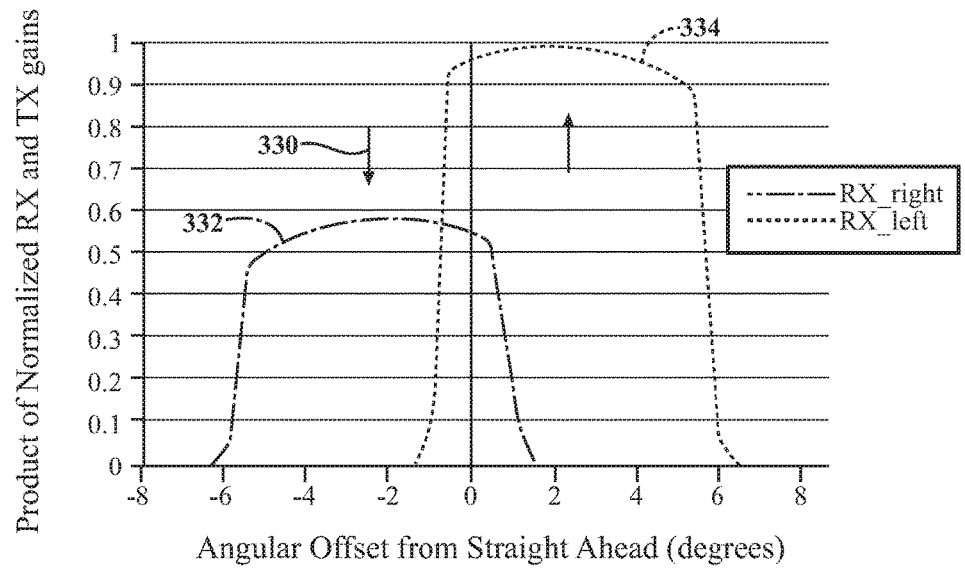
FIGS. 17A and 17B are graphs, similar to FIG. 16, but depicting movement of a detected object to the right and left, respectively, relative to a host vehicle.
Figure 17B:
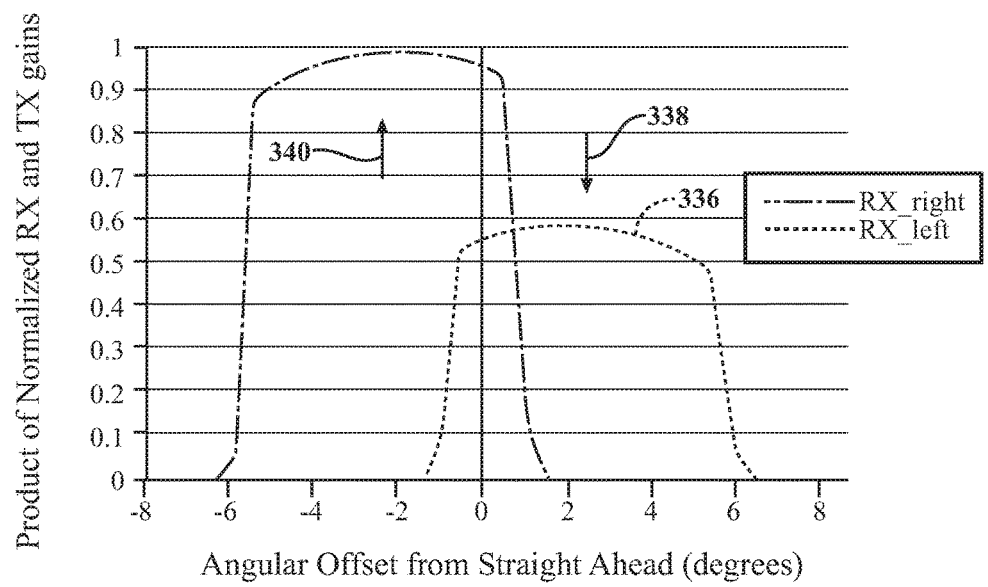

As shown in FIGS. 17A and 17B, if the amplitude of the detected object 312 is decreasing, as shown by the arrow 330 for the wave form 332 in FIG. 17A, but only in one receiver channel, such as the left receiver 303, the wave forms 332 and 334 indicate that the detected object 312 is no longer completely in the lane 314 with the host vehicle 302, but is moving out to the left toward the adjacent left lane 318 as shown for the detected object position 316 in FIG. 14. Oppositely, if the wave form 336 associated with the right receiver 305 is decreasing as shown by the arrow 338 in FIG. 17B, and the amplitude of the wave form 340 for the left receiver 303 remains substantially constant, the wave forms 336 and 340 indicate that the detected object 312 is moving to the right out of the lane 314 in which the host vehicle 302 is traveling toward the adjacent right located lane 322 as shown by detected object position 320 in FIG. 14.

Figure 18A:
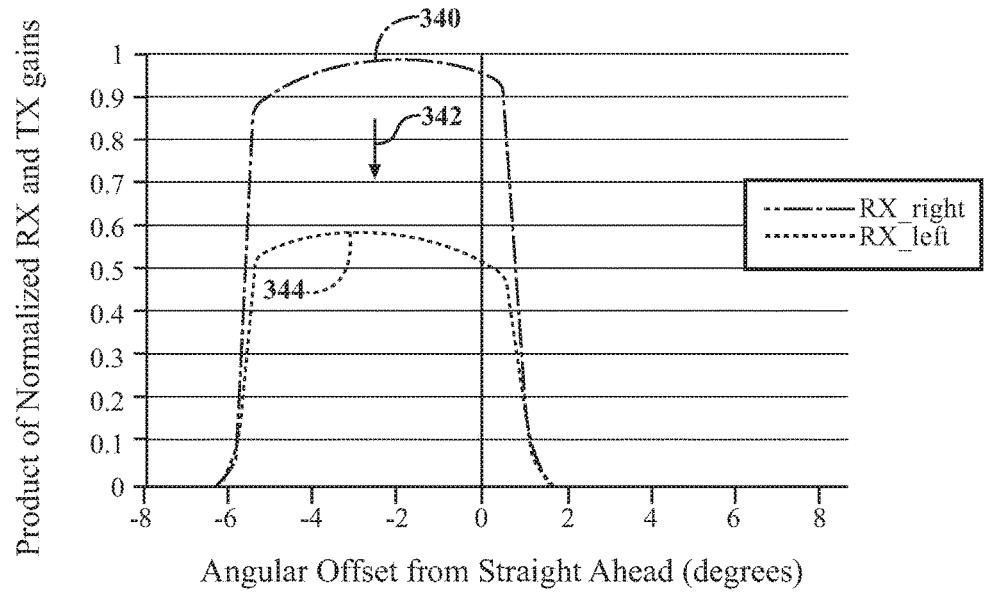
FIGS. 18A and 18B are graphs, similar to FIG. 16, but depicting movement of a detected object moving out from the left and right respectively, relative to the host vehicle.

As shown in FIG. 18A, if the amplitude of the detected object 312 is decreasing from an initial wave form amplitude 341 in the direction of arrow 342 to a lesser amplitude 344, this would indicate that detected object 312 is no longer in the lane 314 with the host vehicle 302 and is moving out and is substantially entirely in the adjacent left lane 318.

The same situation occurs when the amplitude of the wave form 350 for the detected object 312 is seen only by the right receiver 305, not the left receiver 303 and is decreasing from an initial amplitude shown by wave form 350 in the direction of arrow 352 to a lesser amplitude shown by wave form 354 this indicates that the detected object 312 is no longer in the same lane 314 with the host vehicle 302 and is moving toward or in substantially positioned in the adjacent right lane 322.

Figure 18B:
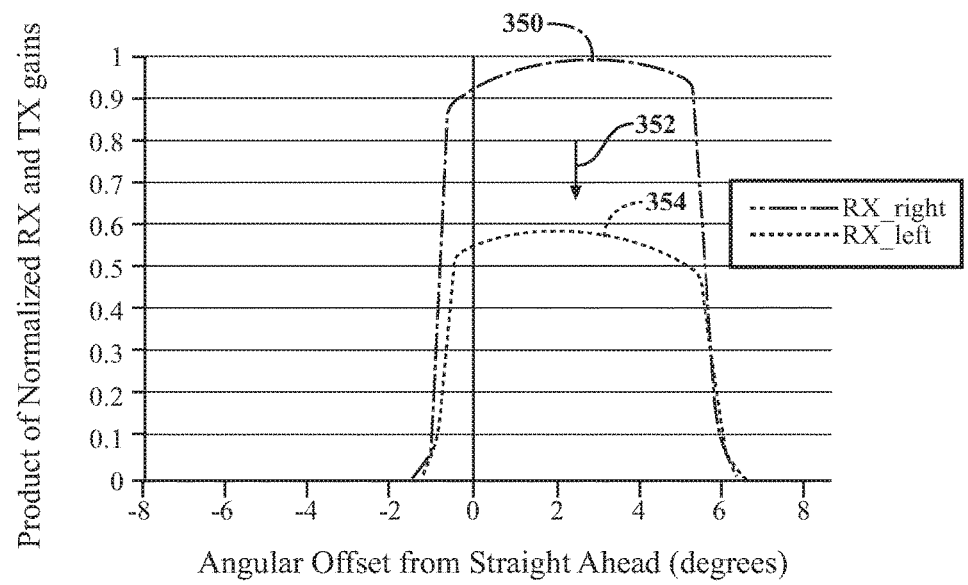
Figure 19A:
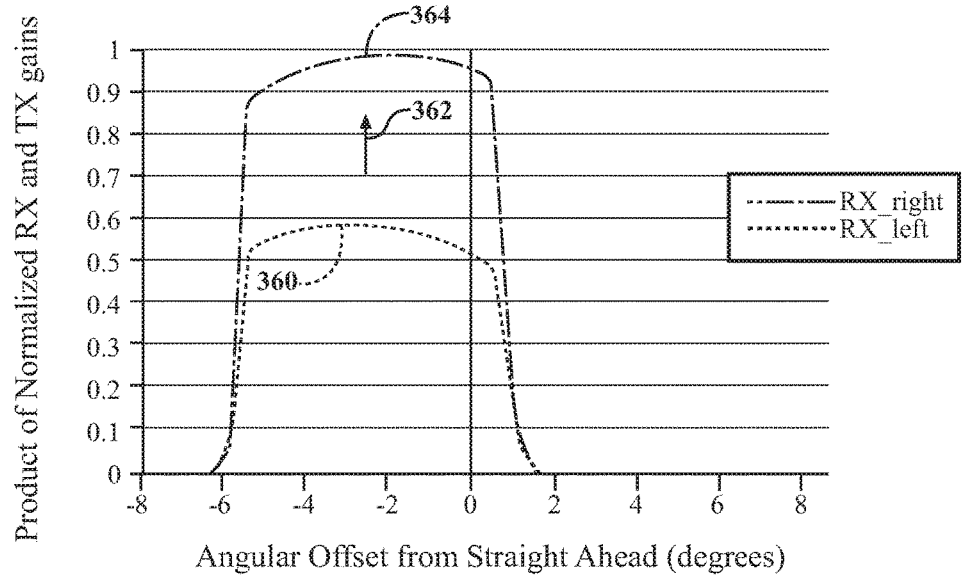

FIGS. 19A and 19B depicted the converse situation from FIGS. 18A and 18B in that wave form 360 depicted only by the left receiver channel 308 is increasing in the direction of arrow 362 from an initial wave form amplitude depicted by wave form 360 to an increased amplitude shown by wave form 364. This indicates that the detected object is moving into the lane 314 occupied by the host vehicle 302 from the left, such as from the adjacent left lane 318, but is not yet completely in the center lane 314. FIG. 19B depicts the opposite situation where the only detected receiver beam 310 is by the right located receiver 305 has an amplitude depicted by wave form 370 which is increasing in the direction of arrow 372 from a prior wave form amplitude 370 to an increased amplitude shown by the wave form 374. This indicates that the detected object 320 is moving from the adjacent right lane 322 into the lane 314 occupied by the host vehicle 302; but it is not yet completely in the center lane 314.

It should be noted that the region of overlap of the return beams 306 and 308, where the amplitudes are roughly equivalent, gives similar information to that of a much larger and very narrow beam antenna without the aperture requirement. In this aspect, the small region of overlap within one degree left and one degree right of the center beam 306 portrays the equivalent of a 2° beam width. Using two overlapping 8° receiver antennas to achieve the effective 2° beam width uses only one half of the aperture area of a two degree beam width antenna while providing much more angular object detection information.

Figure 24:
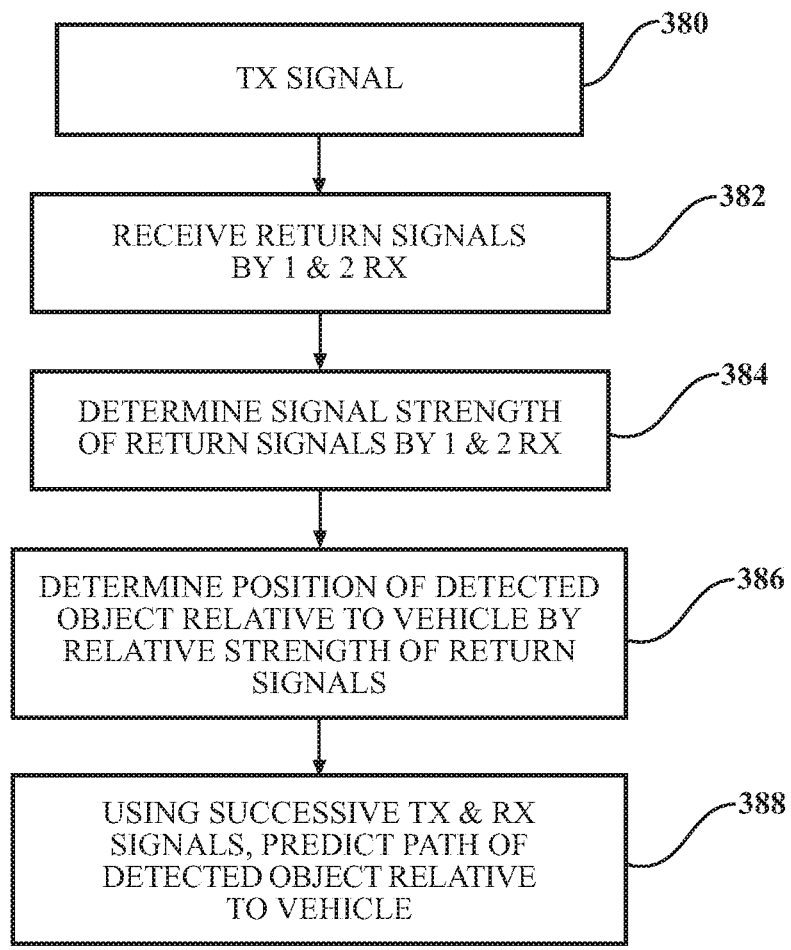
FIG. 24 is a sequence digraph depicting the sequence of operation of the collision warning apparatus shown in FIGS. 14-23.

Referring now to FIG. 24, a brief sequence of the operation of the control 302 will be described. In step 380, the control 300 generates the center transmit beam 306 and then receives, in step 382, the two return receiver beams 308 and 310. The controller 300 determines the signal strength of the return signal beams 308 and 310 received by the receivers 303 and 305 in step 384. The controller 300, in step 386, determines the position of the detected object 312 relative to the host vehicle 302 by the relative strength of the return signals. Next, in step 388, the controller 300 using successive transmitter and receiver signals, predicts the path of the detected object 312 relative to the host vehicle 302.

Figure 22:
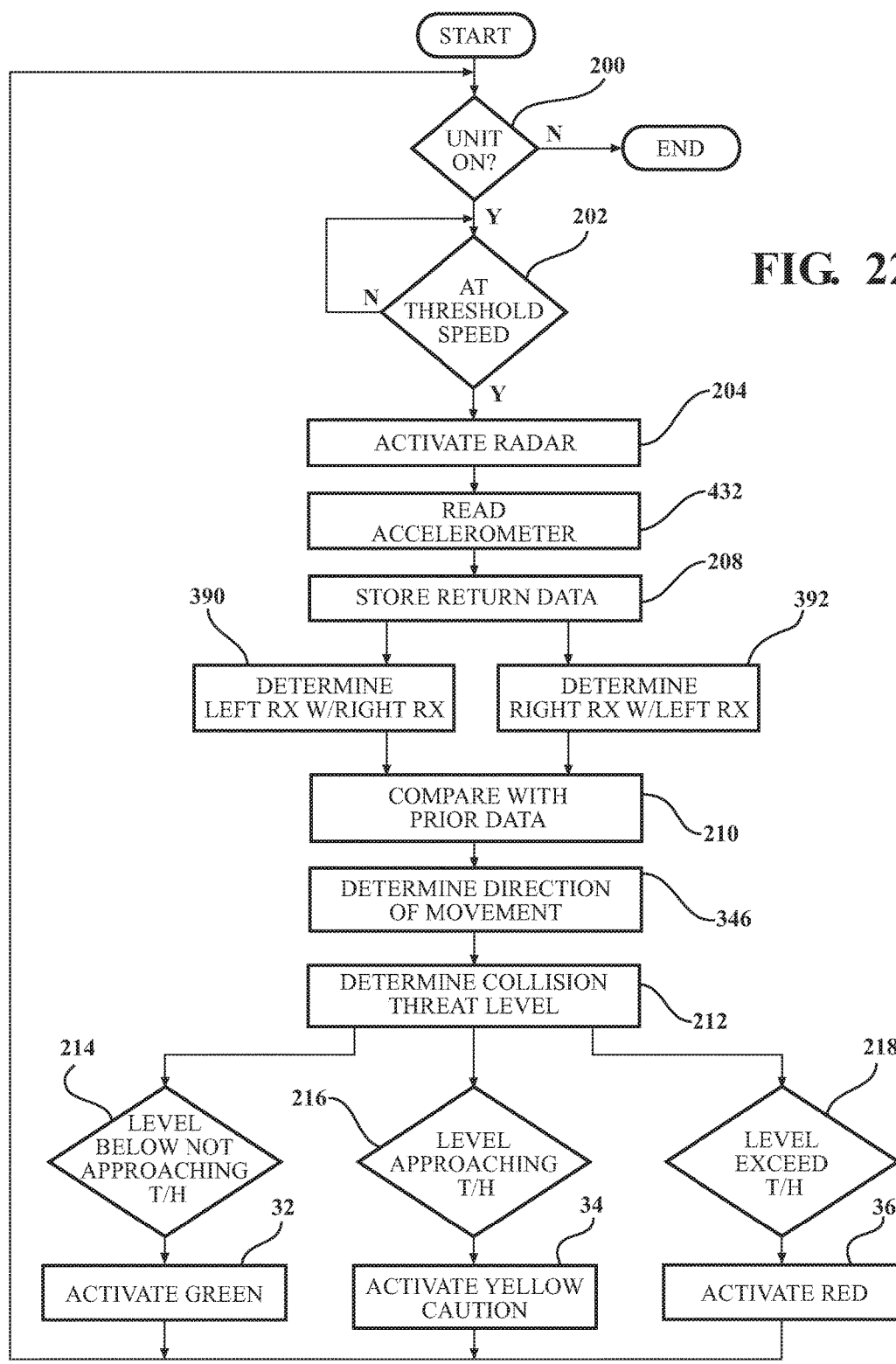
FIG. 22 is a flow diagram depicting the sequence of operation of the control of the collision warning apparatus as shown in FIGS. 20 and 21.

As shown in FIG. 22, which is similar to FIG. 12, the previous aspect of the collision warning apparatus, the controller 300 stores the return receiver signals 308 and 310 data in step 208. An accelerometer 430 output, described hereafter, is then read and stored in step 432. The controller 300 in step 390 then compares the left and right signal amplitudes by comparing the left receiver signal amplitude with the right receiver signal amplitude in step 390 and by comparing the right receiver signal amplitude with the left receiver signal amplitude in step 392. This comparison information is then compared with previous receiver signal amplitude comparison data in step 210. This information is used by the controller 300 to determine the direction of movement of the detected object in step 394.

Figure 23:
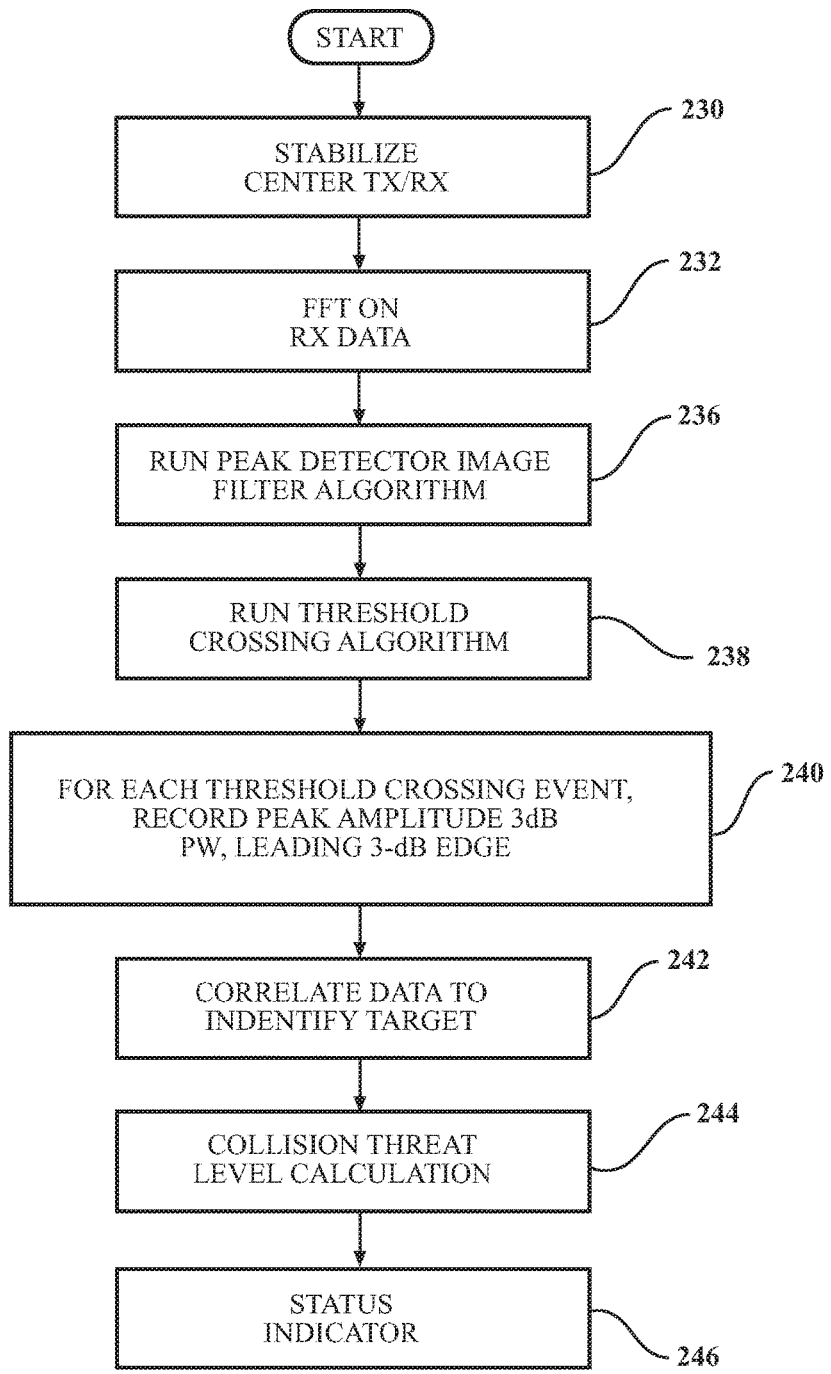
FIG. 23 is a flow diagram depicting the warning calculation sequence executed by the collision warning apparatus as shown in FIGS. 20-22.

The controller then determines the collision threat level in step 212 as previously described. This collision threat detection level determination, shown in FIG. 23, is substantially the same as that described in previous aspect of the collision warning apparatus except for the eliminate of step 234 due to the use single transmitter and pair of angularly offset receivers in this aspect of the collision warning apparatus.

Figure 21:
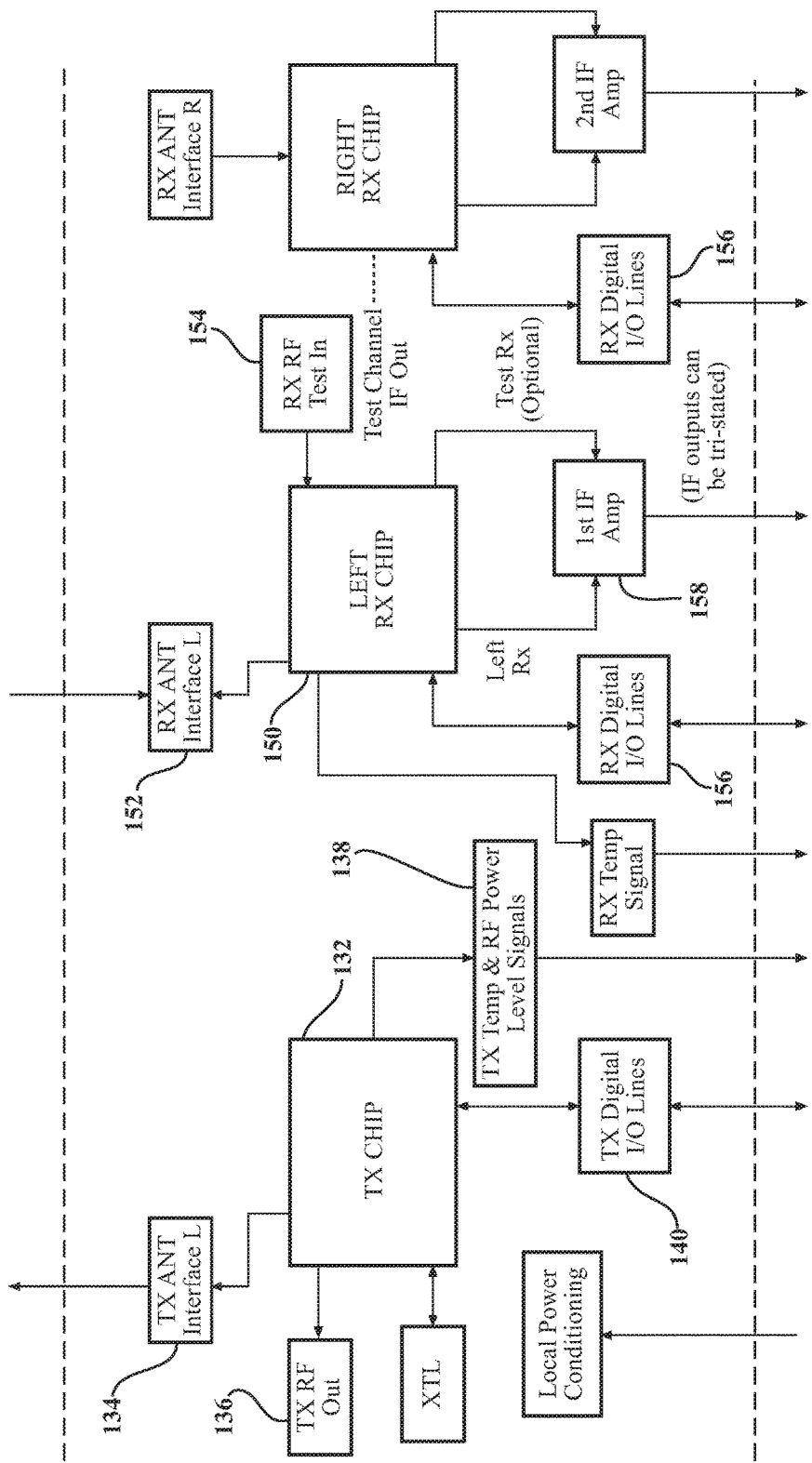
FIG. 21 is a block diagram of the radar transmitter and receiver circuitry used in this aspect of the collision warning apparatus shown in FIG. 20.

In FIG. 21, is similar to FIG. 10 but includes the single transmitter 304 and pair of receivers 305 and 306 circuitry. A description of the operation of the transmitter and receivers circuitry is the same as that described above.

Figure 20:
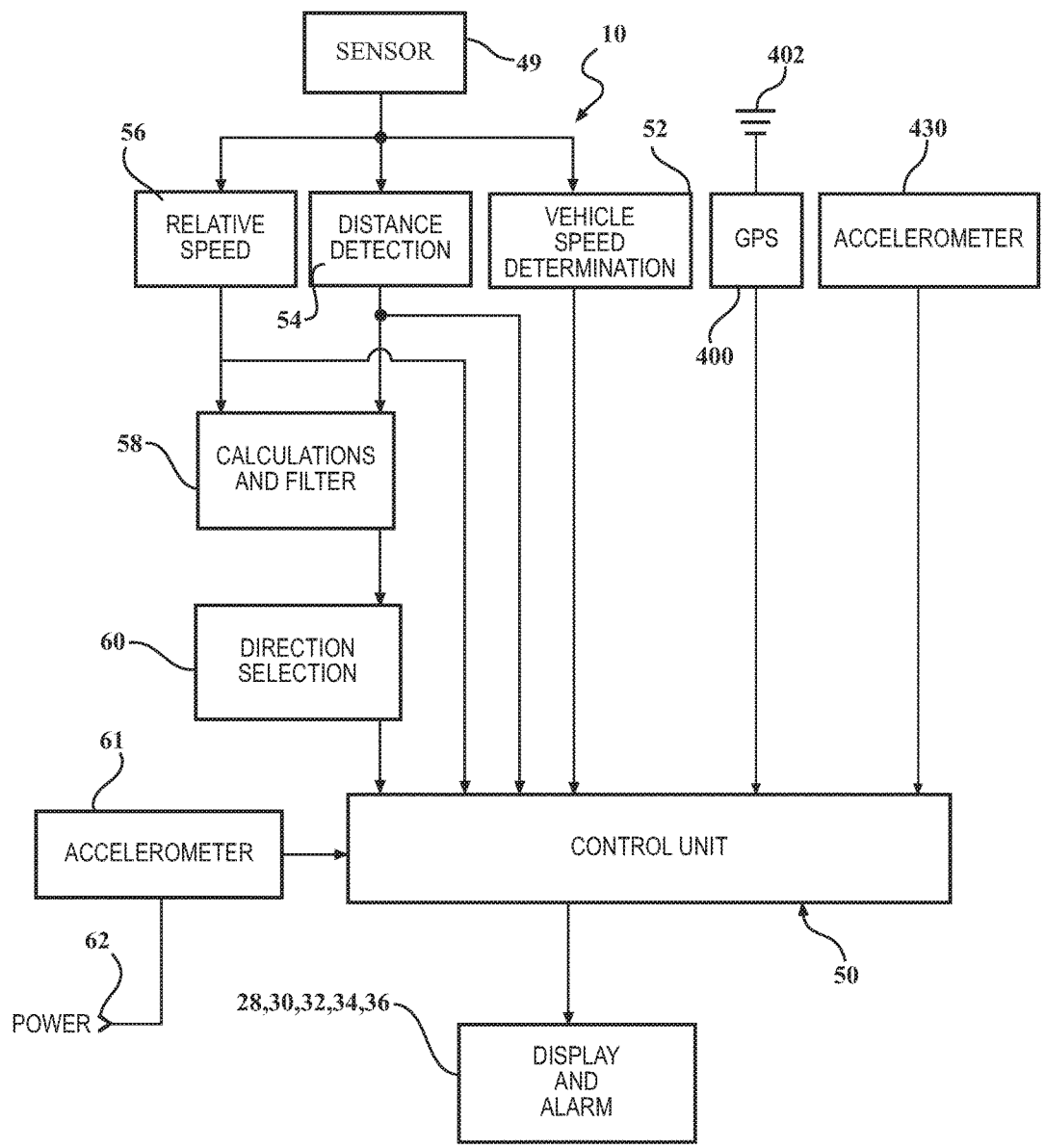
FIG. 20 is a block diagram of the operative elements of the collision warning apparatus shown in FIGS. 14-19B.

Referring to FIG. 20, additional features of this aspect of the collision warning apparatus 290 are illustrated. The collision warning apparatus 290 can be contained in a single portable housing along with the transmitter 304, the receivers 303 and 305 and the related electronic circuit elements. Alternately, the controller 300 can be provided as an integral part of the vehicle control electronics and non-portably mounted in the host vehicle 302 along with the transmitter 304 and the receivers 303 and 305.

A global positioning satellite transceiver 400, shown in FIG. 20, including an antenna 402, can also be provided as part of the collision warning apparatus 302. In the case of the portable housing aspect of the collision warning apparatus, a GPS transceiver 400 and antenna 402 are mounted in the portable housing along with the controller 300, the transmitter 304 and the receivers 303 and 305. If the controller 300 is implemented as part of a controller already existing in the host vehicle 302 or a separate controller added to the host vehicle 302, the GPS transceiver 400 can be implemented using the GPS transceiver already present on the host vehicle 302.

The output of the GPS transceiver 400 is input to the control unit 50 of the controller 300 and can be utilized to provide a location of the host vehicle 302 in conjunction with the receivers beam signals 308 and 310 when a host vehicle 302-speed determination is made. This information can be utilized by the controller 300 to provide lane information, such as the location of the left and right lanes 318 and 322 shown in FIG. 14, whether the left and right lanes 318 and 322 are continuous lanes or are indicative of a left entering and right entering highway lane. This information can also depict an intersection shown in FIG. 25 and describe hereafter.

An accelerometer 430, which may be mounted in the housing of the portable apparatus or separately when the apparatus is integral to the vehicle, measures "g" forces. This measurement, which is input to the control 50 as shown in FIG. 20, is used to measure how hard the vehicle brakes are being applied, how fast the hardware is being accelerated, or how hard the vehicle is going into a turn. These measurements are used by the control 50 to more accurately determine what the vehicle is doing and to improve the accuracy of the collision threat determination.

In both the portable housing aspect and integrally mounted aspect of the controller 300, the controller 300 utilizes the side lobe information of the transmit beam signal 306 to determine the host vehicle speed 302 as previously described. As an alternative, in the integrally mounted configuration of the controller 300 in the hose vehicle 302, the host vehicle 302 speed can be determined by both the side lobe calculation by controller 300 and compared with the vehicle speed information provided by the onboard speed information provided by the host vehicle 302.

FIG. 25 depicts atypical road intersection, in which the lane 304 in which the host vehicle 302 is traveling intersects a laterally extending lane 410. The collision warning apparatus 290 utilizing the controller 300, the transmitter 304 and the receiver pair 303 and 305, can be utilized to detect and predict the lateral path of movement of a detected object, such as vehicle 412 traveling along the lane 410 in the direction of arrow 414 in the forward path of movement of the host vehicle 302 in the lane 314. This is similar to the sequence shown in FIGS. 17A-19B used by the controller 300 to detect object 412 entering the lane 314 along which the host vehicle 302 is traveling, and the exit or departure of the detected vehicle 412 from the lane 314.

By comparing the present return signals amplitude with previously stored amplitudes, the controller 300 can predict the path of movement of the vehicle 412 as, for example, the detected object 412 enters the lane 314 and moves to a position 416 which can be detected by the right receiver signal beam 310 as well as successive positions 418, 420, etc. This information allows the controller 300 to predict the lateral path of movement of the vehicle 412 across the path of forward movement of the host vehicle 302 to determine a collision threat level by predicting whether or not the vehicle 412, based on the relative speed differential of the host vehicle 302 and the detected object 412, and the successive positions of the detected object 412 and the host vehicle 302, will intersect each other representing a collision threat.

What is claimed is:
1. A vehicle collision warning apparatus comprising:
a control coupled to a sensor, both the control and the sensor mountable in a vehicle, the sensor generating at least a center sensor beam to detect an object external of the vehicle; and
the control, responsive to signals solely from the sensor, determining vehicle ground speed through side lobes of the center sensor beam reflecting off a road payment, determining the distance and the relative speed between the vehicle and a detected object external of the vehicle, and activating at least one of a visual and audible indicator indicating the potential for a collision between the vehicle and the detected object based on the vehicle speed and the distance and the relative speed between the vehicle and a detected object external of the vehicle.

2. The apparatus of claim 1 comprising:
the control having only an electrical power connection to the vehicle as a sole electrical connection to the vehicle.

3. The apparatus of claim 1 wherein:
the control includes a processor executing a stored control program.

4. The apparatus of claim 1 wherein:
the sensor is a radar.

5. The apparatus of claim 4 wherein the radar comprises:
a plurality of transmitters and a plurality of receivers arranged in a plurality of transmitter and receiver pairs.

6. The apparatus of claim 5 wherein:
the control sequences between each transmitter and receiver pair.

7. The apparatus of claim 5 wherein:
each of the plurality of transmitters generates a main radar beam.

8. The apparatus of claim 7 wherein:
the plurality of main radar beams from the transmitters partially overlap each other.

9. The apparatus of claim 7 further comprising:
the control, in response to an output of the plurality of main radar beams, determining the vehicle speed and the distance, direction, and relative speed between the vehicle and a detected object external of the vehicle moving in a lateral direction across a front of the vehicle, to indicate potential for collision between a vehicle and the detected object.

10. The apparatus of claim 4 wherein the radar comprises:
at least one transmitter and at least one receiver arranged in a transmitter and receiver pair.

11. The apparatus of claim 1 wherein the at least one indicator comprises:
a caution indicator indicative of an external object detected by the sensor with decreasing distance from the vehicle; and
an alert indicator indicative of an impending collision with the detected external object.

12. The apparatus of claim 1 further comprising:
a selector carried on the housing allowing selection between at least two driver preference modes of vehicle operation relative to a closing distance threshold; and
the control, responsive to the selector, for varying the closing distance threshold.

* * * * *